United States Patent
Ito et al.

(10) Patent No.: US 10,260,656 B2
(45) Date of Patent: Apr. 16, 2019

(54) VACUUM VALVE AND VACUUM PRESSURE CONTROL SYSTEM USING THE SAME

(71) Applicant: CKD CORPORATION, Komaki-shi, Aichi (JP)

(72) Inventors: Minoru Ito, Kasugai (JP); Masayuki Watanabe, Kasugai (JP); Seiji Hashiguchi, Ichinomiya (JP)

(73) Assignee: CKD CORPORATION, Komaki-shi (JP)

( * ) Notice: Subject to any disclaimer, the term of this patent is extended or adjusted under 35 U.S.C. 154(b) by 22 days.

(21) Appl. No.: 15/597,921

(22) Filed: May 17, 2017

(65) Prior Publication Data
US 2017/0351275 A1    Dec. 7, 2017

(30) Foreign Application Priority Data

Jun. 2, 2016   (JP) .................................. 2016-110969

(51) Int. Cl.
| | | |
|---|---|---|
| *F16K 51/02* | (2006.01) | |
| *F16J 1/00* | (2006.01) | |
| *F16K 1/46* | (2006.01) | |
| *G05D 16/20* | (2006.01) | |

(52) U.S. Cl.
CPC .............. *F16K 51/02* (2013.01); *F16J 1/008* (2013.01); *F16K 1/46* (2013.01); *G05D 16/2053* (2013.01); *G05D 16/2093* (2013.01)

(58) Field of Classification Search
CPC .............. F16K 51/02; F16K 1/46; F16J 1/008
See application file for complete search history.

(56) References Cited

U.S. PATENT DOCUMENTS

| | | | | |
|---|---|---|---|---|
| 4,083,529 A | * | 4/1978 | Santy | F16J 15/32 251/173 |
| 5,375,812 A | * | 12/1994 | Kent | F16J 15/18 251/214 |
| 6,491,059 B2 | * | 12/2002 | Kajitani | F16K 31/1221 137/530 |
| 6,708,721 B2 | * | 3/2004 | Fukuda | F16K 49/002 137/338 |
| 6,805,152 B2 | * | 10/2004 | Kanzaka | F16K 31/122 137/338 |
| 7,168,676 B2 | * | 1/2007 | Kajitani | F16K 1/52 251/285 |
| 7,434,780 B2 | * | 10/2008 | Hayashi | F16K 31/1221 251/12 |
| 7,624,716 B2 | * | 12/2009 | Bessho | F02D 9/1015 123/337 |

(Continued)

FOREIGN PATENT DOCUMENTS

| | | |
|---|---|---|
| JP | 2001-173838 A | 6/2001 |
| JP | 2008-121859 A | 5/2008 |
| JP | 2011-243217 A | 12/2011 |

*Primary Examiner* — Eric Keasel
(74) *Attorney, Agent, or Firm* — Oliff PLC

(57) ABSTRACT

A vacuum valve placed between a vacuum vessel and a vacuum pump to adjust a valve opening degree using an operating fluid includes a packing mounted in a recessed groove of a piston. The packing is provided with a contact portion on a radially inner side and a contact portion on a radially outer side, and a slide-contact portion contacting with an inner peripheral surface of a cylinder. A portion between the contact portion and the slide-contact portion has a thin thickness.

16 Claims, 14 Drawing Sheets

(56) References Cited

U.S. PATENT DOCUMENTS

| | | | | |
|---|---|---|---|---|
| 7,841,578 B2 * | 11/2010 | Ishigaki | ............... | F16K 27/02 |
| | | | | 251/335.3 |
| 7,862,002 B2 * | 1/2011 | Naitoh | ............... | F16K 51/02 |
| | | | | 251/335.3 |
| 2008/0111095 A1 | 5/2008 | Naitoh et al. | | |

* cited by examiner

AA: DEVIATION AMPLIFYING CIRCUIT

XX: SOLENOID VALVE FOR SUPPLY
YY: SOLENOID VALVE FOR EXHAUST

XX: SOLENOID VALVE FOR SUPPLY
YY: SOLENOID VALVE FOR EXHAUST

XX: SOLENOID VALVE FOR SUPPLY
YY: SOLENOID VALVE FOR EXHAUST

VACUUM VALVE AND VACUUM PRESSURE CONTROL SYSTEM USING THE SAME

CROSS-REFERENCE TO RELATED APPLICATIONS

This application is based upon and claims the benefit of priority from the prior Japanese Patent Application No. 2016-110969 filed on Jun. 2, 2016, the entire contents of which are incorporated herein by reference.

BACKGROUND

Technical Field

The present invention relates to a vacuum valve to be placed between a vacuum vessel and a vacuum pump, and a vacuum pressure control system using the vacuum valve.

Related Art

In general vacuum industries or semiconductor industries, for example, a vacuum valve is placed between a vacuum vessel or container and a vacuum pump to control the vacuum pressure in the vacuum vessel. In the vacuum valve, a piston accommodated in a cylinder is moved by the operating pressure of an operating fluid to adjust a valve opening degree to prevent generation of particles. In exhausting gas from the vacuum vessel by driving of the vacuum pump to reduce the vacuum pressure in the vacuum vessel to a predetermined vacuum pressure, for the purpose of shortening an exhaust time, the vacuum valve is operated to first regulate exhaust gas to a small or low flow rate, thereby reducing the pressure in the vacuum vessel to such a degree that does not raise or blow up particles, and then regulate the exhaust gas to a high flow rate. For instance, a vacuum valve in a first conventional example is configured such that a bellofram hermetically closes the space defined by an outer peripheral surface of a piston and an inner peripheral surface of a cylinder to cause the bellofram to roll along with movement of the piston in order to reduce the sliding resistance between the piston and the cylinder and achieve low hysteresis and high response to accurately control the vacuum pressure (see e.g. Patent Documents 1 and 2).

In a vacuum valve in a second conventional example, a valve element is coupled to a lower end of a rod connected to a piston loaded in a cylinder. Compressed air is supplied to and exhausted from the cylinder to change the operating pressure acting on the piston, thereby bringing the valve element into or out of contact with a valve seat. In the vacuum valve in the second conventional example, the piston is formed, on its outer peripheral surface, with a recessed groove in which an O-ring is mounted (see e.g. Patent Document 3).

RELATED ART DOCUMENTS

Patent Documents

Patent Document 1: 2001-173838 A
Patent Document 2: JP 2011-243217 A
Patent Document 3: JP 2008-121859 A

SUMMARY

Technical Problems

However, the vacuum valve in the first conventional example in which the bellofram is accommodated in the cylinder has a problem with an increased valve size. In a semiconductor manufacturing field, for a compact apparatus, a vacuum valve is desired to have reduced size while providing good control performance. Further, because of the bellofram specifically designed, the vacuum valve in the first conventional example would be expensive.

In the vacuum valve in the second conventional example, meanwhile, the sliding resistance occurs between the O ring and the cylinder when the piston is moved. Thus, this vacuum valve could not accurately adjust the valve opening degree simply by the operating pressure. When valve opening degree is to be controlled, such a vacuum valve needs a potentiometer to feedback-control the valve opening degree. This would result in increased size and cost.

The present invention has been made in view of the circumstances to solve the above problems and has a purpose to provide a compact and inexpensive vacuum valve having good controllability and a vacuum pressure control system using the vacuum valve.

Means of Solving the Problems

To achieve the above purpose, one aspect of the invention provides a vacuum valve comprising: a body provided with a valve seat; a valve element configured to contact with or separate from the valve seat; a cylinder connected to the body and configured to be supplied with or exhaust an operating fluid; a piston accommodated in the cylinder and provided with a recessed groove in an annular shape opening toward an inner circumferential surface of the cylinder; a packing having an annular shape and mounted in the recessed groove; and a rod connecting the piston and the valve element, the vacuum valve being to be placed between a vacuum vessel and a vacuum pump and being configured to control operating pressure acting on the piston by supply and exhaust of the operating fluid with respect to the cylinder to adjust a valve opening degree corresponding to a distance between the valve element and the valve seat, wherein the packing includes: a contact portion provided on a radially inner side; and a slide-contact portion provided on a radially outer side than the contact portion, the slide-contact portion has a thin thickness in a portion connecting to the contact portion, and when the piston starts to move in an opposite direction to a previous moving direction of the piston, irrespective of where the valve element is disposed between a full closed position and a full open position, the slide-contact portion is flexibly deformed with respect to the contact portion.

Another aspect of the invention provides a vacuum pressure control system comprising: the aforementioned vacuum valve; an electropneumatic regulator including: a solenoid valve for supply; a solenoid valve for exhaust; an operation command section configured to duty-control the solenoid valve for supply and the solenoid valve for exhaust; and an operating pressure measurement unit configured to measure the operating pressure to be output to the vacuum valve, the electropneumatic regulator being configured to control the operating fluid to be supplied to and exhausted from the vacuum valve; and a controller configured to receive a vacuum pressure measured value from a vacuum pressure measurement unit for measuring pressure in the vacuum vessel and output an operating pressure set value to the operation command section based on a deviation between the vacuum pressure measured value and a vacuum pressure set value, wherein the operation command section is configured to generate a first pulse signal for the solenoid valve for supply and a second pulse signal for the solenoid valve for exhaust with a frequency within a range of 140 kHz to 170 kHz based on a deviation between an operating pressure measured value measured by the operating pressure measurement unit and the operating pressure set value, and output the first pulse signal to the solenoid valve for supply and the second pulse signal to the solenoid valve for exhaust.

DESCRIPTION OF EMBODIMENTS

A detailed description of an embodiment of a vacuum valve and a vacuum pressure control system embodying the present invention will now be given referring to the accompanying drawings.

First Embodiment

Figure 1:
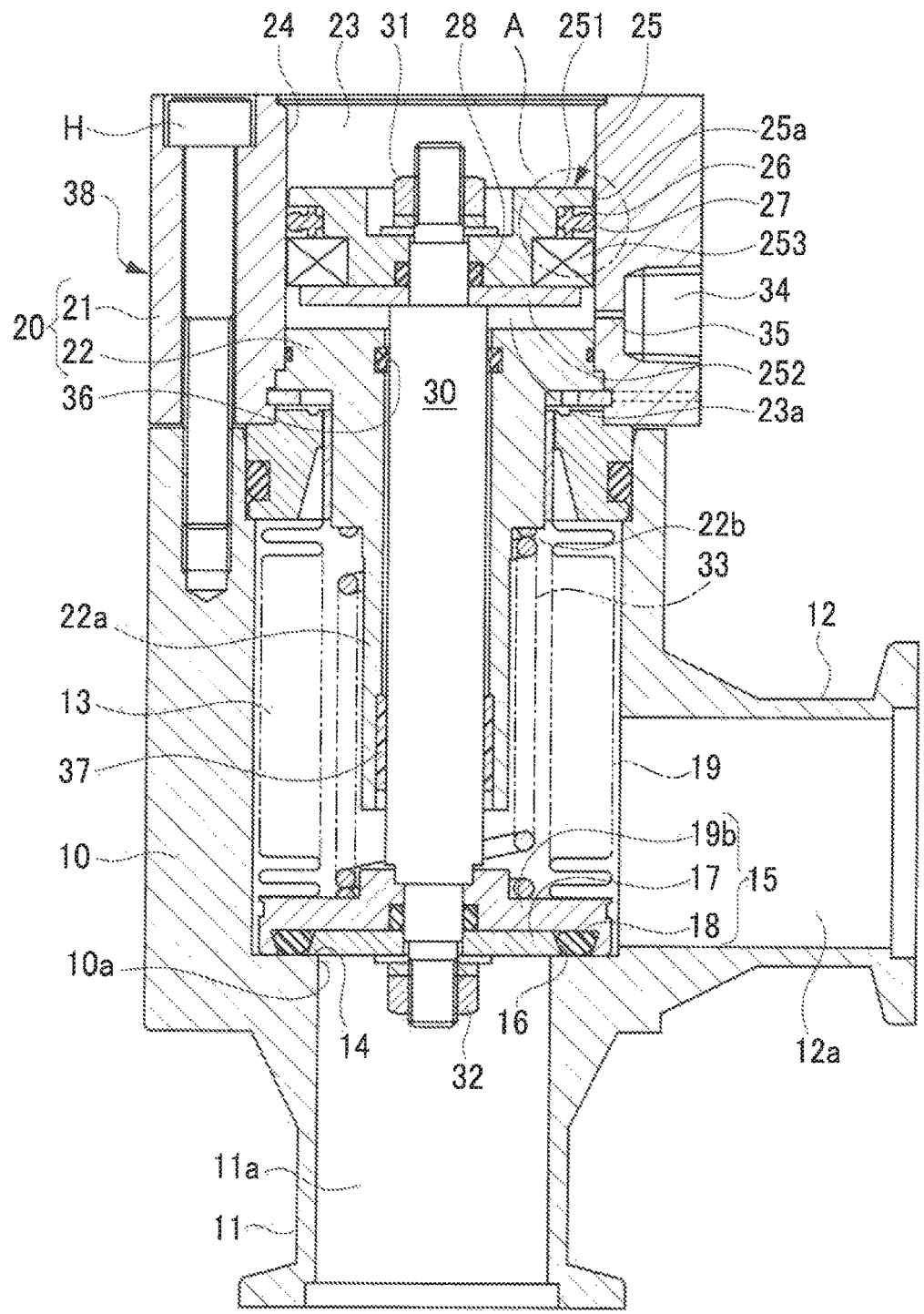
FIG. 1 is a cross sectional view of a vacuum valve in a first embodiment.
Figure 7:
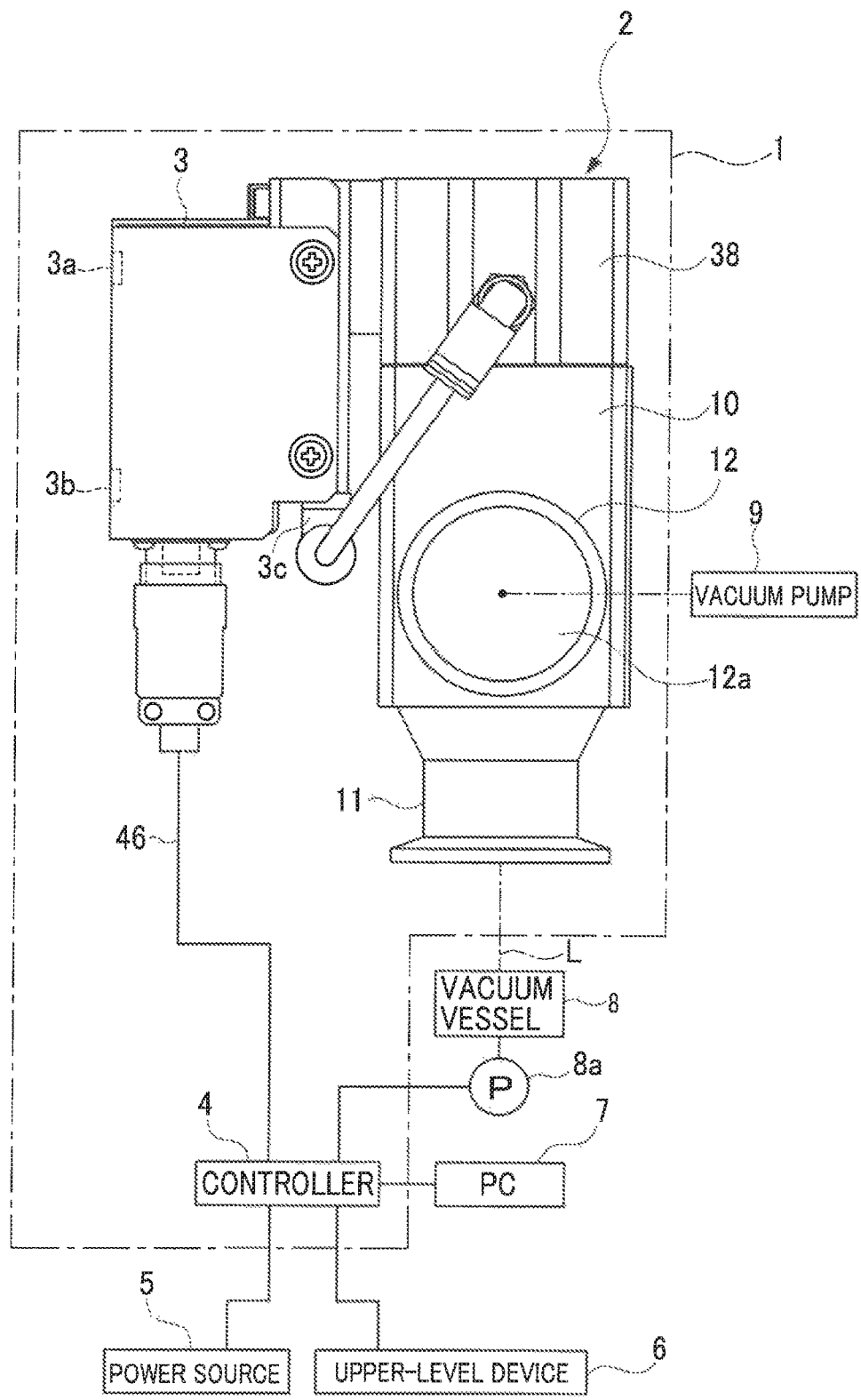
FIG. 7 is a schematic configuration view of a vacuum pressure control system using the vacuum valve shown in FIG. 1.

FIG. 1 is a cross sectional view of a vacuum valve 2 in a first embodiment. FIG. 7 is a schematic configuration view of a vacuum pressure control system 1. This vacuum pressure control system 1 will be used to control the pressure in a vacuum vessel 8 for performing e.g. a semiconductor deposition process. The vacuum pressure control system 1 is configured to cause the vacuum valve 2 placed between the vacuum vessel 8 and the vacuum pump 9 to control an exhaust flow rate to a low or small flow rate (Low flow control) and then to a high flow rate (High flow control) in order to quickly control the pressure in the vacuum vessel 8 without raising particles. In the present embodiment, mainly, a packing 27 of the vacuum valve 2 in FIG. 1 contributes to improvement of controllability. Control of the vacuum pressure control system 1 in FIG. 7 contributes to improvement in response of the vacuum valve 2. Therefore, the schematic structure of the vacuum valve 2, the structure of the packing 27, the operation of the vacuum valve 2, and a test to investigate valve opening degree characteristics of the vacuum valve 2 are firstly described below to show the characteristics of the vacuum valve 2. Further, subsequent description is given to the whole structure of the vacuum pressure control system 1, a method for driving a solenoid valve for supply and a solenoid valve for exhaust, the operation of the vacuum pressure control system 1, a resolution test on the vacuum pressure control system 1, and a vacuum pressure control test to show the characteristics of the vacuum pressure control system 1.

<Schematic Structure of Vacuum Valve>

As shown in FIG. 1, the vacuum valve 2 includes a body 10 and an actuator 38 connected to the body 10 with a bolt H, which form an outer appearance of the vacuum valve 2. The vacuum valve 2 is a single-acting valve configured to be opened by the operating pressure of operating fluid supplied to the actuator 38 and returned to a valve closing state by a compression spring 33.

The body 10 is formed with a valve chamber 13 located between the body 10 and the actuator 38. The body 10 is provided with a first port forming member 11 and a second port forming member 12 which intersect with each other, allowing a first port 11a and a second port 12a to communicate with each other through the valve chamber 13. The body 10 is configured such that the first port 11a and the valve chamber 13 are arranged coaxially, and a valve seat 14 is formed flat along an outer circumference of a valve hole 10a provided between the first port 11a and the valve chamber 13. A valve element 15 is accommodated in the valve chamber 13 and configured to contact with or separate from the valve seat 14.

In the actuator 38, a piston 25 is housed in a cylinder 20. This cylinder 20 includes a cylinder main body 21 having a cylindrical shape with a lower opening that is closed by a rod holding member 22. This rod holding member 22 includes a guide part 22a supporting the rod 30 and protruding in the valve chamber 13. For centering of the rod 30, a seal packing 36 and a bearing 37 are placed between the rod 30 and the guide part 22a. Through this rod 30, the piston 25 is connected to the valve element 15.

The piston 25 has a nearly circular column shape and is connected to an upper end of the rod 30. The piston 25 is an assembly of a circular support plate 252, a seal member 28, a mounting ring 253, a packing 27, and a piston main body 251, which are stacked on the upper end of the rod 30 and secured thereto with a first mounting screw 31. An outer peripheral surface 25a of the piston 25 is formed with an annular recessed groove 26 opening toward an inner peripheral surface 24 of the cylinder 20. In this recessed groove 26, an annular packing 27, which will be mentioned later, is mounted. The piston 25 partitions a cylinder chamber 23 of the cylinder 20 to form an operation chamber 23a on a side of the piston 25 facing to the valve seat 14. The cylinder 20 includes an operation port 34 communicated with the operation chamber 23a through a communication passage 35 to allow supply and release of the operating fluid with respect to the operation chamber 23a.

The valve element 15 has a circular plate-like shape and is connected to a lower end of the rod 30. This valve element 15 is an assembly of a lower end plate 19b of bellows 19, an elastic seal member 18, and a retaining plate 17, which are stacked and fixed to the lower end of the rod 30 with a second mounting screw 32 secured thereto. The elastic seal member 18 is mounted so as to be elastically deformable in an annular dovetail groove 16 defined between the lower end plate 19b and the retaining plate 17. The elastic seal member 18 protrudes from an end face of the valve element 15 on a side facing the valve seat 14 and can be compressed between the valve seat 14 and the valve element 15.

The compression spring 33 is provided in a compressed state between a shoulder 22b of the rod holding member 22 and the valve element 15 to apply sealing load to the valve element 15 to make the elastic seal member 18 seal against the valve seat 14, i.e., to urge the valve element 15 toward the valve seat 14. The bellows 19 is placed to be expandable and contractible within the valve chamber 13 to cover over the compression spring 33 in order to prevent a fluid flowing through the valve chamber 13 from leaking into the actuator 38 or prevent particles generated from the compression spring 33 from getting mixed in the fluid flowing through the valve chamber 13

<Structure of Packing>

Figure 2:
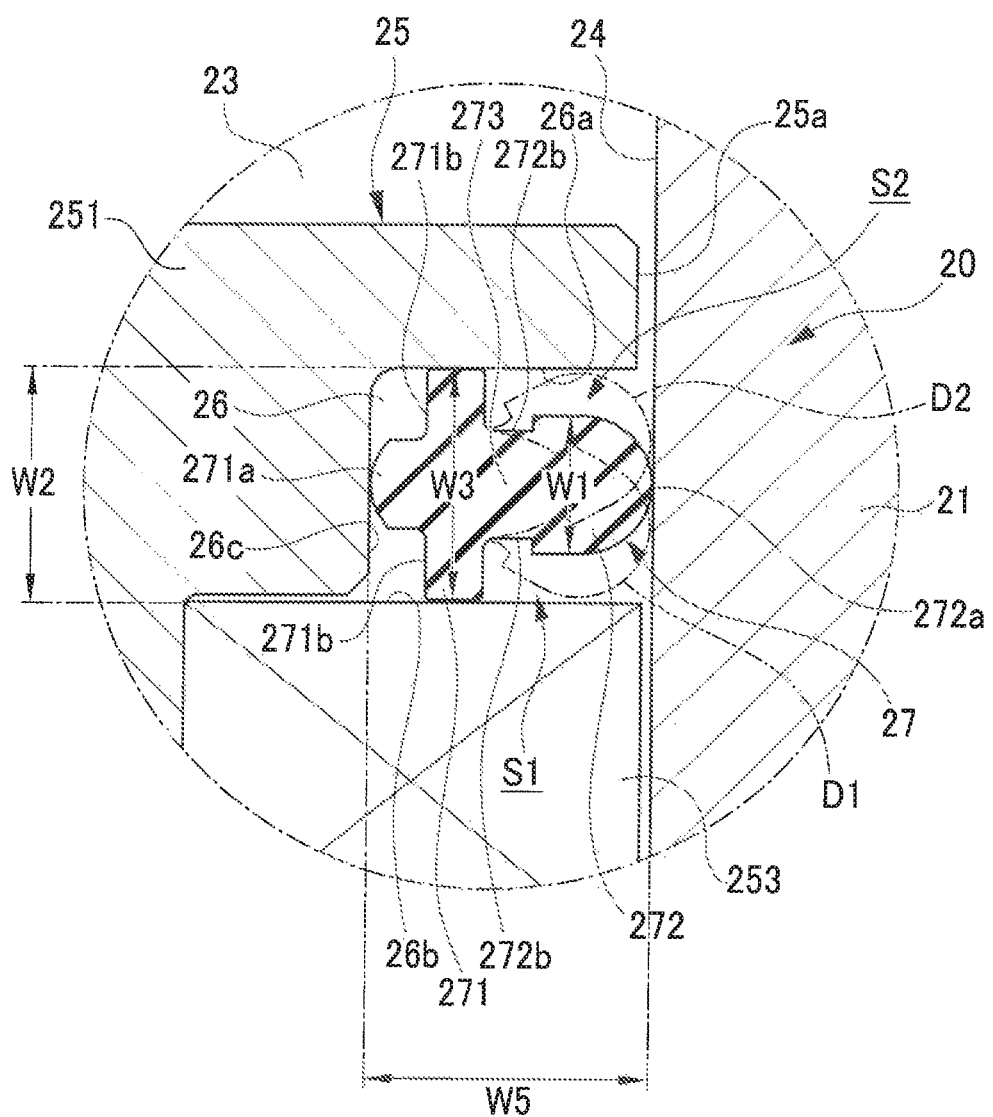
FIG. 2 is an enlarged cross sectional view of a part A in FIG. 1.
Figure 3:
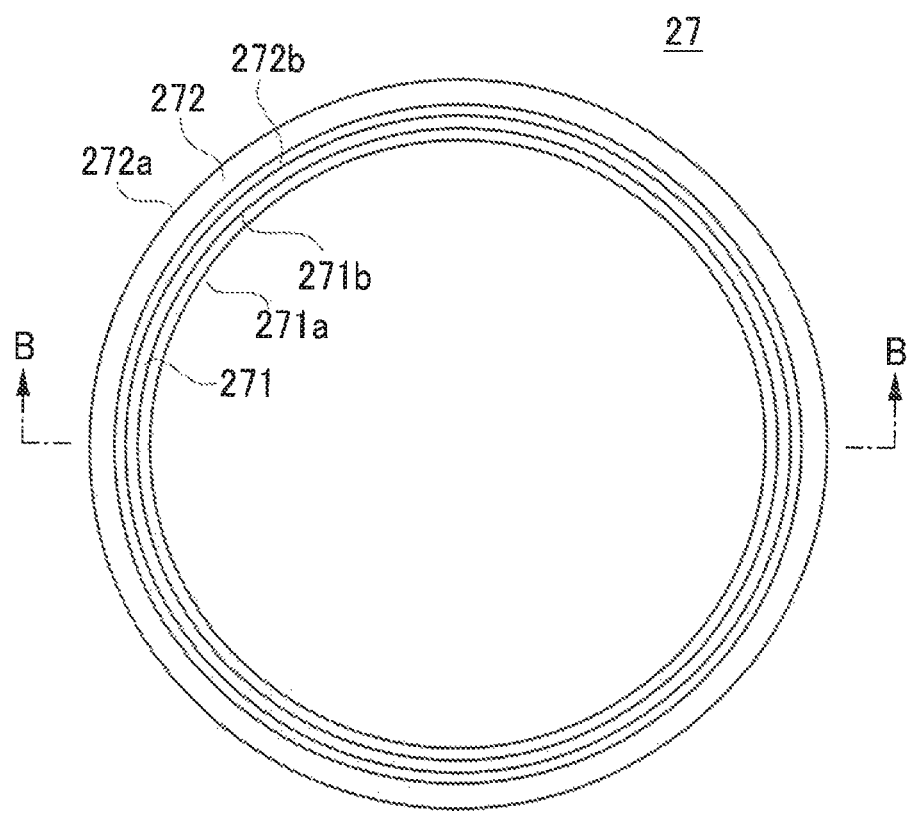
FIG. 3 is a plane view of a packing.
Figure 4:
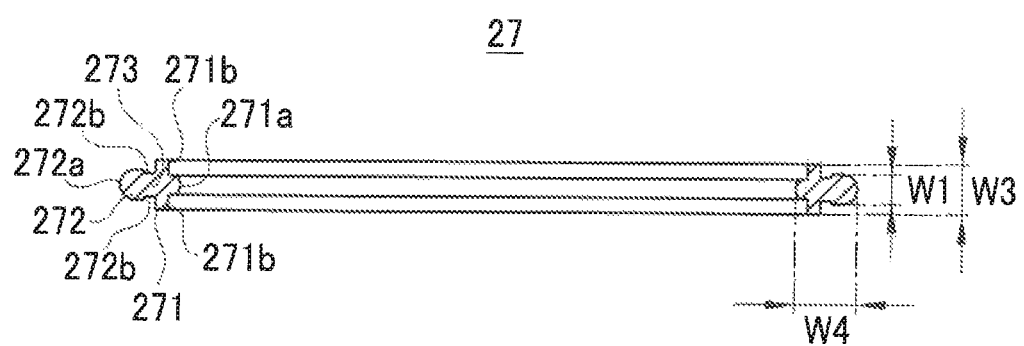
FIG. 4 is a cross sectional view taken along a line B-B in FIG. 3.

FIG. 2 is an enlarged sectional view of a part A circled by a chain line in FIG. 1. FIG. 3 is a plan view of the packing 27. FIG. 4 is a cross sectional view taken along a line B-B in FIG. 3. In FIGS. 2 and 4, for convenience of explanation, deformation of a slide-contact portion 272 indicated by a chain double-dashed line into a first deformed position, or posture, D1 and a second deformed position D2 and a difference between a first thickness W1 and a second thickness W3 are described emphatically. The packing 27, as shown in FIG. 3, is an annular component made of elastic material, such as rubber or resin. As shown in FIGS. 3 and 4, the packing 27 is provided with a contact portion 271 on a radially inner side and a slide-contact portion 272 on a radially outer side.

The packing 27 shown in FIG. 4 has a smaller inner diameter defined by an inner circumferential portion 271a than the diameter of a bottom surface 26c (see FIG. 2) of the recessed groove 26. The packing 27 further has an outer diameter defined by an outermost end 272a larger than the inner diameter of the inner peripheral surface 24a of the cylinder 20. An average width W4 from the inner circumferential portion 271a to the outermost end 272a is slightly larger than an average distance W5 (see FIG. 2) from the bottom surface 26c to the inner peripheral surface 24a. Thus, when the packing 27 is mounted in the recessed groove 26 of the piston 25 as shown in FIG. 2, the packing 27 is compressed in a radial direction, thereby sealing between the piston 25 and the cylinder 20.

As shown in FIG. 4, the contact portion 271 is designed such that an average value of the second thickness W3 of the contact portion 271 in the axial direction is almost equal to an average value of a groove width W2 of the recessed groove 26 in the axial direction, that is, a distance between an upper internal surface 26a and a lower internal surface 26b. When the packing 27 is mounted in the recessed groove 26 of the piston 25 shown in FIG. 2, the packing 27 is less likely to wobble in the axial direction.

As shown in FIG. 4, the packing 27 has a first thickness W1 at the slide-contact portion 272 and a second thickness W3 at the contact portion 271 in the axial direction. Specifically, the slide-contact portion 272 is designed with an average value of the first thickness W1 in the axial direction smaller than an average value of the second thickness W3 of the contact portion 271, that is, than the groove width W2 of the recessed groove 26 in FIG. 2. Thus, when the packing 27 is placed between the piston 25 and the cylinder 20 as shown in FIG. 2, a clearance S1 is generated between a lower internal surface 26b of the recessed groove 26 and the slide-contact portion 272 and further a second clearance S2 is generated between an upper internal surface 26a and the slide-contact portion 272. Accordingly, the slide-contact portion 272 is deformable within the recessed groove 26 into the first deformed position D1 or the second deformed position D2 as illustrated in FIG. 2. The packing 27 is designed such that a portion of the slide-contact portion 272 connecting to the contact portion 271 has a thin thickness and thus the slide-contact portion 272 is easy to be flexibly deformed in the axial direction with respect to the contact portion 271. Specifically, the packing 27 is provided with recesses 272b one on each of upper and lower end faces of the slide-contact portion 272, each recess 272b extending annularly along the portion of the slide-contact portion 272 connecting to the contact portion 271. That is, the slide-contact portion 272 is formed with a thin portion 273 having a thin thickness in the axial direction of the packing 27. In addition, the contact portion 271 is provided with annular cutout grooves 271b one on each of upper and lower sides of the inner circumferential portion 271a in the axial direction of the packing 27 in FIGS. 2 and 4. When the piston 25 starts to move, therefore, the packing 27 is easy to get deformed without changing a contact position the outermost end 272a contacting with the cylinder 20.

Herein, a maximum deformation amount of the slide-contact portion 272 in the axial direction, that is, a deformation amount of the slide-contact portion 272 to be deformed from the first deformed position D1 to the second deformed position D2 is set to be equal to or larger than the distance between a valve closing position in which the piston 25 causes the elastic seal member 18 to seal against the valve seat 14 and a position in which the piston 25 causes the elastic seal member 18 to separate from the valve seat 14. In the present embodiment, for instance, when the valve element 15 is moved upward by about 50 μm from the valve closing position, the elastic seal member 18 is separated from the valve seat 14 and the packing 27 is deformed by a deformation amount of about 50 μm from the first deformed position D1 to the second deformed position D2. The vacuum valve 2 can therefore adjust a compression amount of the elastic seal member 18 deformed by the valve seat 14 and the valve element 15 within a deformation region in which the piston 25 is moved while deforming the slide-contact portion 272.

<Operations of Vacuum Valve>

In the vacuum valve 2 in FIG. 1, while the operating fluid is exhausted out of the operation chamber 23a, the piston 25 is not pressurized in a direction away from the valve seat 14 ("separating direction"), i.e., in an upward direction in FIG. 1. Accordingly, the valve element 15 causes the elastic seal member 18 to seal against the valve seat 14 by sealing load of the compression spring 33, so that the vacuum valve 2 is in a valve closing state.

When the operating fluid is supplied through the operation port 34 into the vacuum valve 2, the operating pressure in the operation chamber 23a rises, thereby applying a load acting in the separating direction to the piston 25. When the operating pressure in the operation chamber 23a becomes larger than the spring force of the compression spring 33, the piston 25 attempts to move in the separating direction.

The packing 27 in FIG. 2 with the contact portion 271 mounted in the recessed groove 26 also attempts to move in the separating direction together with the piston 25. At that time, in the packing 27 with the slide-contact portion 272 held in contact with the inner peripheral surface 24 of the cylinder 20, a static friction force occurs between the outermost end 272a of the slide-contact portion 272 and the inner peripheral surface 24 of the cylinder 20. Since the slide-contact portion 272 of the packing 27 includes the thin portion 273 having a thin thickness due to the recesses 272b, the slide-contact portion 272 can be flexibly deformed in the axial direction through the thin portion 273 with respect to the contact portion 271. Therefore, even when the static friction force occurs between the slide-contact portion 272 and the cylinder 20, the piston 25 is allowed to start to move in the separating direction immediately when pressed in the separating direction, while deforming the thin portion 273 of the slide-contact portion 272. During this period, the sliding resistance between the slide-contact portion 272 of the packing 272 and the inner peripheral surface 24 of the cylinder 20 becomes zero. Thus, the vacuum valve 2 can control the valve opening degree with good response according to the operating pressure of the operating fluid in the deformation region in which the piston 25 is moved while deforming the slide-contact portion 272 of the packing 27. Accordingly, the vacuum valve 2 can achieve low hysteresis and high response, and good controllability, equivalent to e.g. the vacuum valve provided with the bellofram in the first conventional example. The vacuum valve 2 has a simple configuration that the packing 27 having the thin portion 273 in the slide-contact portion 272 connecting to the contact portion 271 is simply mounted in the recessed groove 26 of the piston 25. This vacuum valve 2 can be more compact and more inexpensive than the vacuum valve provided with the bellofram in the first conventional example. Further, the vacuum valve 2 is configured such that the valve opening degree and the operating pressure have a linear relationship in the region in which the piston 25 is moved while deforming the packing 27. The valve opening degree can be adjusted only by the operating pressure. This needs no additional sensor to execute feedback-control the valve opening degree. Consequently, the vacuum valve can provide improved controllability with reduced size and reduced cost.

In addition, the vacuum valve 2 is configured such that the contact portion 271 is formed with the cutout grooves 271b one on each of the both sides of the inner circumferential portion 271a that contacts with the bottom surface 26e of the recessed groove 26. Thus, as the thin portion 273 of the slide-contact portion 272 is deformed, the contact portion 271 is also deformed. Accordingly, the vacuum valve in which the piston 25 is smoothly moved while deforming the packing 27 according to the operating pressure can achieve good controllability.

As shown by the first deformed position D1 in FIG. 2, when the slide-contact portion 272 is stopped from being further deformed by contact with the lower internal surface 26b of the recessed groove 26 on a side facing to the valve seat 14, the piston 25 is moved in the separating direction while allowing the slide-contact portion 272 to slide-contact with the inner peripheral surface 24 of the cylinder 20, thereby increasing the valve opening degree. In this case, sliding resistance occurs between the slide-contact portion 272 and the inner peripheral surface 24 of the cylinder 20. However, since this sliding resistance occurs when the piston 25 and the valve element 15 are moved largely in the separating direction, the sliding resistance is less likely to be problematic in adjusting the valve opening degree.

When the vacuum valve 2 is to be brought in a valve closing state, the operating fluid is exhausted from the operation chamber 23a. When the operating pressure in the operation chamber 23a decreases, the piston 25 starts to be moved toward the valve seat 14 by the spring force of the compression spring 33. At that time, the piston 25 is moved in a direction toward the valve seat 14 ("seating direction"), i.e. in a downward direction in FIG. 1 while causing deformation of the packing 27 from the first deformed position D1 to the second deformed position D2 shown in FIG. 2, and thereafter further moved in the seating direction while making the slide-contact portion 272 slide on the cylinder 20. The piston 25 causes the elastic seal member 18 of the valve element 15 to seal against the valve seat 14, so that the vacuum valve 2 thus comes to the valve closing state.

Next, for valve opening of the vacuum valve 2, the piston 25 is moved in the separating direction while making the slide-contact portion 272 slide on the cylinder 20 and change its posture from the second deformed position D2 to the first deformed position D1 in FIG. 2. Thus, the vacuum valve 2 can achieve a wide deformation region of the slide-contact portion. 272 at the start time of valve opening and thus accurately adjust the valve opening degree in a wide range according to the operating pressure in the operation chamber 23a. Furthermore, in the vacuum valve 2, when the piston 25 starts to move in an opposite direction to a previous moving direction, irrespective of where the valve element 15 is positioned between a full closed position and a full open position, the slide-contact portion 272 is flexibly deformed with respect to the contact portion 271.

Herein, the vacuum valve 2 to be disposed between the vacuum vessel 8 and the vacuum pump 9 as shown in FIG. 7 normally controls exhaust gas at a low, or small, flow rate at the exhaust start time and thereafter controls the exhaust gas at a high flow rate when the pressure in the vacuum vessel 8 is reduced to such a degree that no particle is raised or disturbed. Accordingly, to control the pressure in the vacuum vessel 8 to prevent particles from being raised in the vacuum vessel 8, it is essential for the vacuum valve 2 to accurately adjust a small or minute valve opening degree close to a valve closing state. The vacuum valve 2 in the present embodiment is configured such that, the elastic seal member 18 is pressed or compressed between the valve element 15 and the valve seat 14 during valve closing to seal against the valve seat 14 as shown in FIG. 1. When the compression amount of the elastic seal member 18 is reduced, gas in the vacuum vessel 8 (see FIG. 7) leaks through between the elastic seal member 18 and the valve seat 14 and flows at a low flow rate toward the vacuum pump 9 (see FIG. 7). The vacuum valve 2 shown in FIG. 1 is configured such that the maximum deformation amount of the slide-contact portion 272 of the packing 27 to be axially deformed in the recessed groove 26 is equal to or larger than the distance between the valve closing position in which the valve element 15 is placed with the elastic seal member 18 sealing against the valve seat 14 and the position in which the valve element 15 is placed with the elastic seal member 18 separated from the valve seat 14. Thus, in the deformation region in which the piston 25 is moved without generating sliding resistance between the packing 27 and the cylinder 20, the compression amount of the elastic seal member 18 can be adjusted. Consequently, according to the vacuum valve 2 in the present embodiment, in the deformation region in which the piston 25 is moved while causing deformation of the slide-contact portion 272, small valve opening degree that changes the compression amount of the elastic seal member 18 can be adjusted accurately by the operating pressure. Thus, good controllability can be achieved.

<Test for Investigating Valve Opening Degree Characteristics of Vacuum Valve>

The present inventors carried out a test for investigating the valve opening degree characteristics on an example and a comparative examples of the vacuum valve 2. One used as the example is a vacuum valve provided with PSD packing (Trade name), produced and distributed by Sakagami Seisakusho Ltd., mounted in a recessed groove of a piston. One used as the comparative example is a vacuum valve provided with an O ring packing having a circular cross section, mounted in a recessed groove of a piston. The example and the comparative example are similar in structure excepting the PSD packing and the O ring packing. In the test, for each of the example and the comparative example, the operating pressure is changed and the valve opening degree is measured at each operating pressure.

Figure 5:
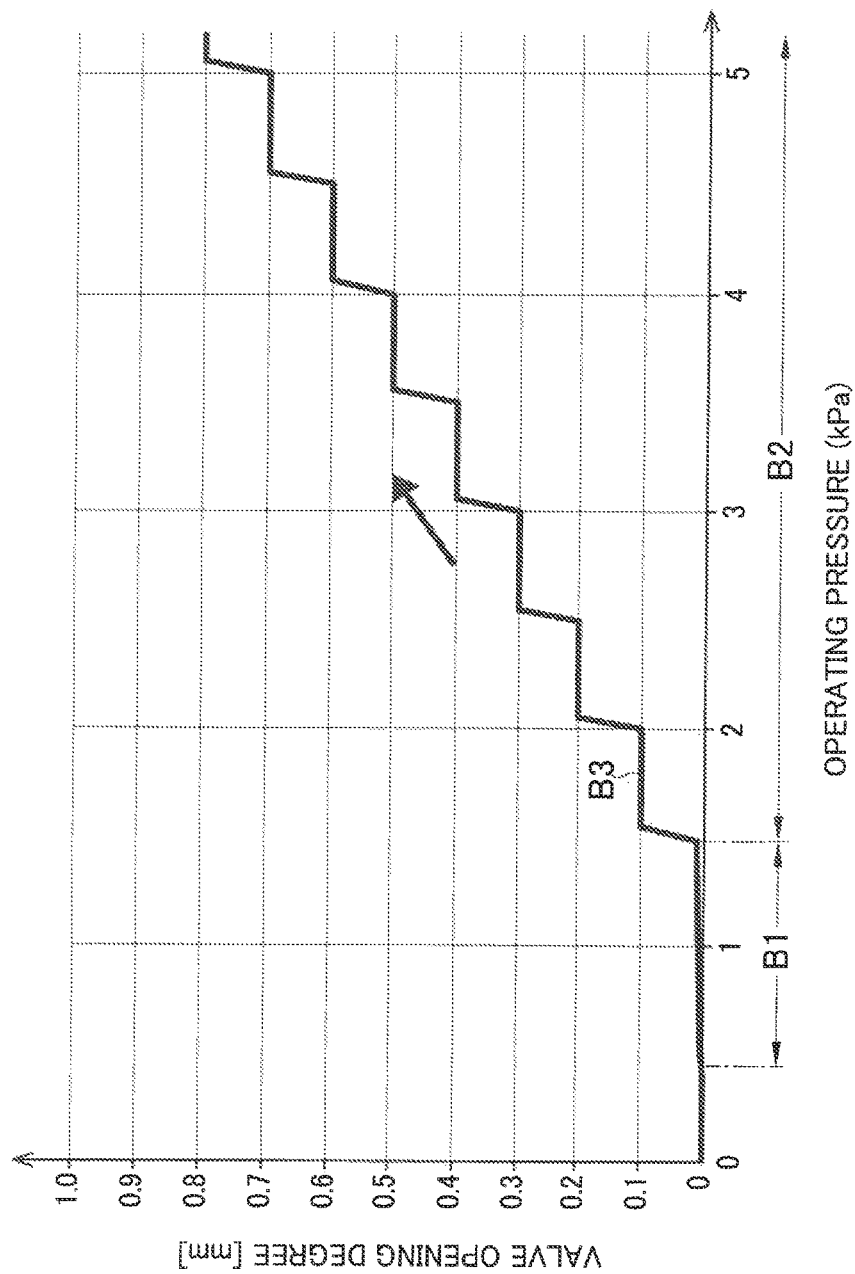
FIG. 5 is a graph showing a relationship between valve opening degree and operating pressure obtained by investigation of valve opening degree characteristics in an example.

FIG. 5 is a graph showing a relationship between valve opening degree and operating pressure as a result of investigation of valve opening degree characteristics in the example. In this graph, the vertical axis indicates the valve opening degree (mm) of the valve element and the horizontal axis indicates the operating pressure (kPa). In the example, for a range B1 of the operating pressure from about 0.5 kPa to about 1.5 kPa, the valve opening degree linearly increases from 0 mm to about 50 For a range B2 of the operating pressure exceeding 1.5 kPa, the valve opening degree increases stepwise with respect to the operating pressure, i.e., the valve opening degree increases in steps of about 0.1 mm every time when the operating pressure increases by about 0.5 kPa (Stick-slip phenomenon).

Figure 6:
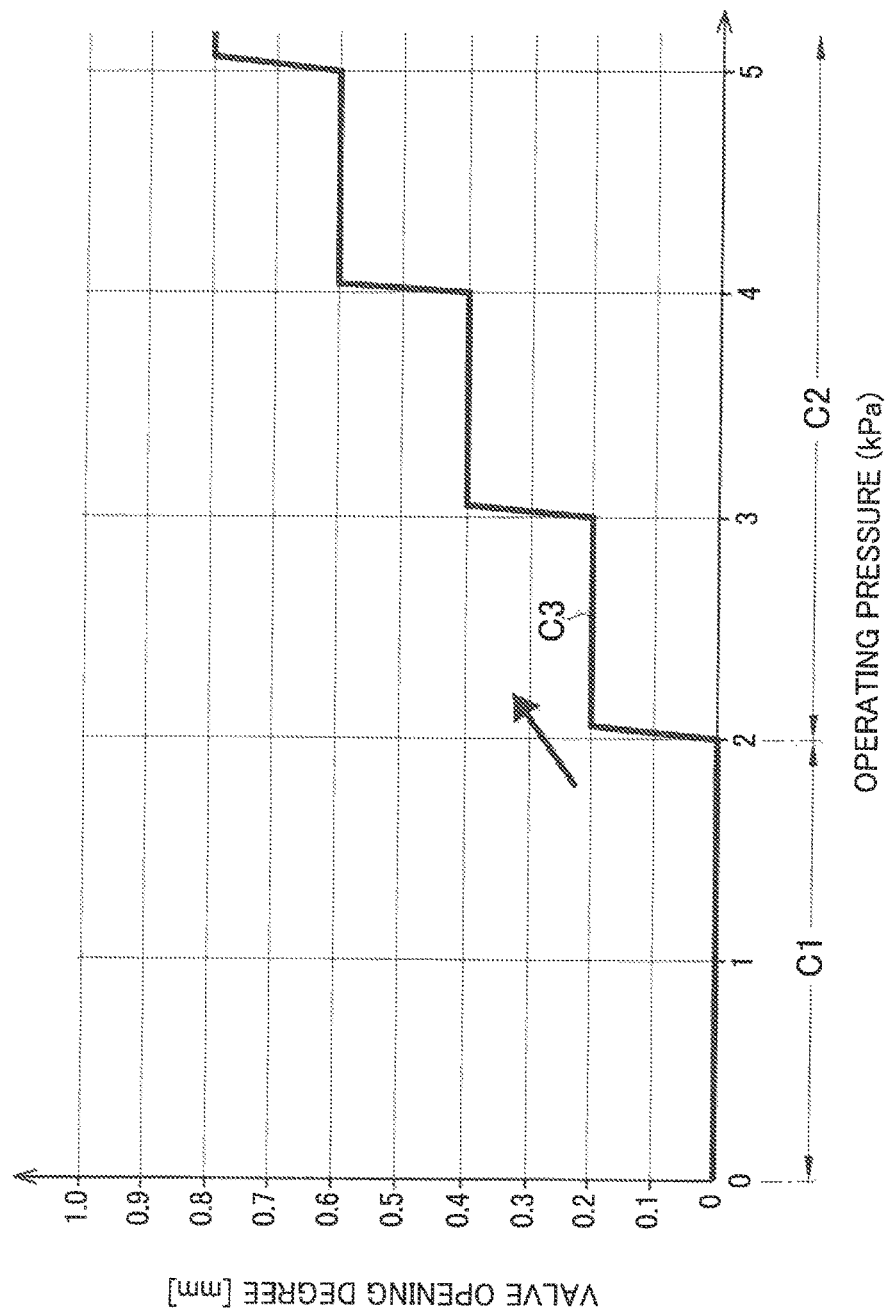
FIG. 6 is a graph showing a relationship between valve opening degree and operating pressure obtained by investigation of valve opening degree characteristics in a comparative example.

FIG. 6 is a graph showing a relationship between valve opening degree and operating pressure as a result of investigation of valve opening degree characteristics in the comparative example. In this graph, the vertical axis indicates the valve opening degree (mm) of the valve element and the horizontal axis indicates the operating pressure (kPa). In a range C1 of the operating pressure equal to or less than 2 kPa, the valve opening degree of the valve element 15 is 0 mm. In the comparative example, when the operating pressure becomes 2 kPa, the valve opening degree rises by 0.2 mm. Thereafter, in a range C2 in which the operating pressure exceeds 2 kPa, the valve opening degree changes stepwise with respect to the operating pressure, i.e., the valve opening degree increases by about 0.2 mm every time when the operating pressure increases by about 1 kPa (Stick-slip phenomenon).

In the example, accordingly, as shown in the range B1 in FIG. 5, since the valve opening degree is proportional to the operating pressure at the start time of valve opening, the valve opening degree can be controlled only by the operating pressure. In the comparative example, in contrast, as shown in FIG. 6, the valve opening degree is not proportional to the operating pressure and hence the valve opening degree cannot be controlled by the operating pressure alone. Consequently, the example is superior to the comparative example in the controllability at the start time of valve opening. This conceivably results from the following difference between the comparative example and the example. In the comparative example, the piston does not start to move unless the operating pressure acting on the end face of the piston on a side facing the valve seat becomes equal to or larger than the maximum static friction force that occurs between the O ring and the cylinder. In the example, in contrast, even when the operating pressure acting on the end face of the piston on a side facing to the valve seat is smaller than the maximum static friction force that occurs between the slide-contact portion and cylinder, the piston can move while flexibly deforming the slide-contact portion according to the operating pressure.

In the example, as shown in the range B2 in FIG. 5, when the sliding friction occurs between the slide-contact portion and the cylinder, a dead zone B3 occurs. This dead zone B3 is narrower than a dead zone C3 in the comparative example in FIG. 6. Thus, the valve opening degree in the example provides higher response with respect to changes in operating pressure and higher controllability than in the comparative example. This is conceivably because the packing in the example is smaller in elasticity (repulsive force) than the O ring in the comparative example and thus the sliding resistance in the example is smaller than that in the comparative example.

<Whole Structure of Vacuum Pressure Control System>

As shown in FIG. 7, the vacuum pressure control system 1 is provided with the aforementioned vacuum valve 2, an electropneumatic regulator 3, and a controller 4.

The vacuum valve 2 to be disposed between the vacuum vessel 8 and the vacuum pump 9 to shut off a flow passage L connecting the vacuum vessel 8 and the vacuum pump 9 and control a flow rate of exhaust gas to be fed from the vacuum vessel 8 to the vacuum pump 9. The electropneumatic regulator 3 is attached to the side surface of the vacuum valve 2.

The controller 4 is a well-known microcomputer which is driven upon receipt utility power supplied from a power source 5. The controller 4 is connected to a higher-level device 6, a personal computer 7, a vacuum pressure sensor 8*a* for measuring the pressure in the vacuum vessel 8 (one example of a vacuum pressure measurement unit), and others. Further, the controller 4 is also connected to the electropneumatic regulator 3 through a cable 46. The controller 4 calculates a command voltage (one example of an operating pressure set value) to be applied to the electropneumatic regulator 3 based on a difference, or deviation, between a vacuum pressure measured value measured by the vacuum pressure sensor 8*a* and a vacuum pressure set value of the vacuum vessel 8 transmitted from the higher-level device 6 or the personal computer 7, and then outputs the calculated command voltage to the electropneumatic regulator 3. Thus, the vacuum pressure in the vacuum vessel 8 is feedback-controlled.

Figure 8:
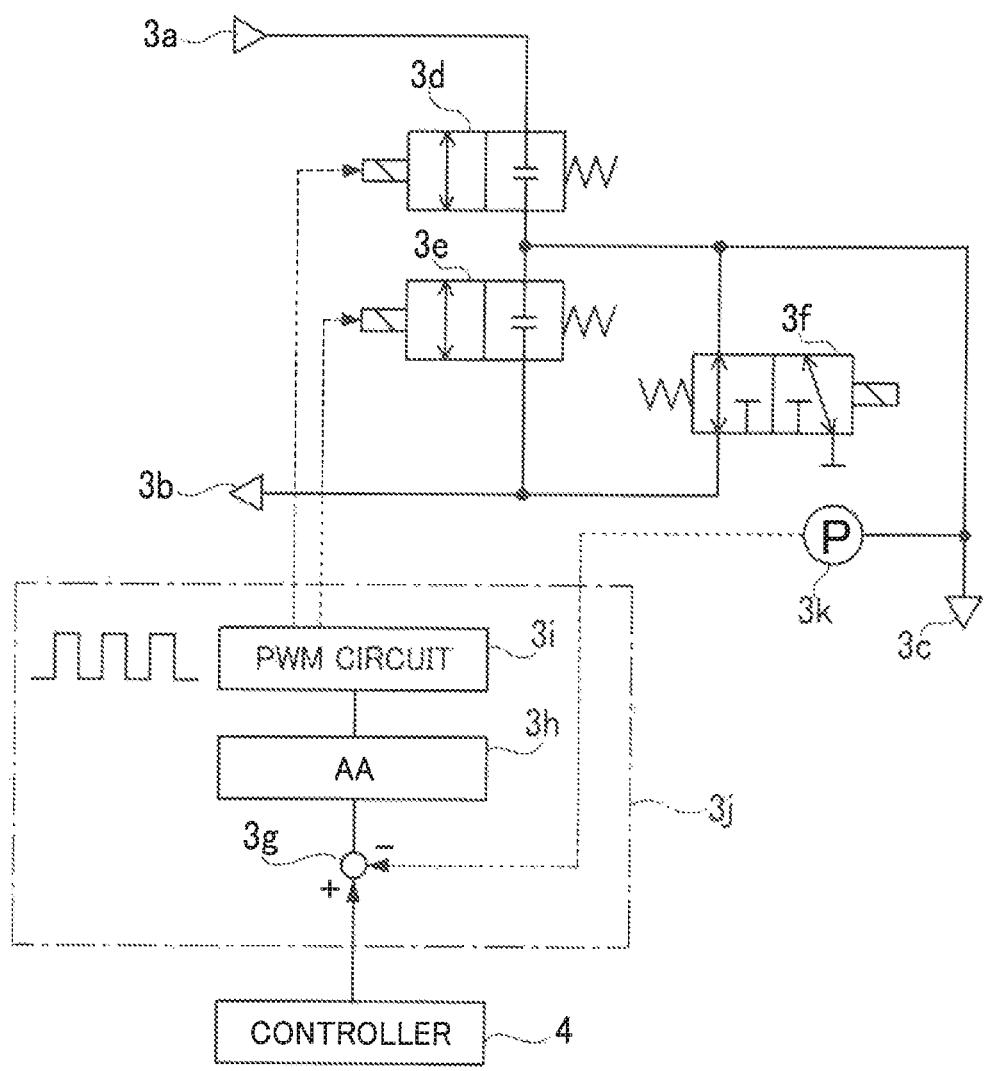
FIG. 8 is a circuit diagram of an electropneumatic regulator.

FIG. 8 is a circuit diagram of the electropneumatic regulator 3. This electropneumatic regulator 3 is provided with a solenoid valve for supply ("supply solenoid valve") 3*d*, a solenoid valve for exhaust ("exhaust solenoid valve") 3*e*, an emergency exhaust valve 3*f*, an operation command section 3*j*, and an operating pressure sensor 3*k* (one example of an operating pressure measurement unit). In the electropneumatic regulator 3, the operation command section 3*j* controls an opening operation of the supply solenoid valve 3*d* and the exhaust solenoid valve 3*e* by a well-known duty control method according to the command voltage transmitted from the controller 4 to thereby control the operating pressure to be supplied to the vacuum valve 2.

The electropneumatic regulator 3 is provided with a first port 3a, a second port 3b, and a third port 3c. The first port 3a is connected to a supply source for supplying an operating fluid. The second port 3b is open to atmosphere. The third port 3c is connected to the operation port 34 (see FIG. 1) of the vacuum valve 2.

As shown in FIG. 8, the supply solenoid valve 3d and the exhaust solenoid valve 3e are arranged in series between the first port 3a and the second port 3b. The third port 3c is communicated to between the supply solenoid valve 3d and the exhaust solenoid valve 3e. Accordingly, in the electropneumatic regulator 3. When the supply solenoid valve 3d is opened and the exhaust solenoid valve 3e is closed, the first port 3a and the third port 3c are communicated with each other. In the electropneumatic regulator 3, when the exhaust solenoid valve 3e is opened and the supply solenoid valve 3d is closed, the third port 3c and the second port 3b are communicated with each other. The emergency exhaust valve 3f is located in parallel to the exhaust solenoid valve 3e. In case of emergency, the emergency exhaust valve 3f increases an exhaust flow rate to instantly bring the vacuum valve 2 in a valve closing state.

The operating pressure sensor 3k is connected to the third port 3c. This third port 3c is communicated with the operation chamber 23a of the vacuum valve 2. The operating pressure sensor 3k detects a current operating pressure of the vacuum valve 2 and outputs an operating pressure detected voltage (one example of an operating pressure measured value).

The operation command section 3j is provided with a subtracter 3g, a deviation amplifying circuit 3h, and a PWM circuit 3i. The subtracter 3g calculates a deviation between the command voltage transmitted from the controller 4 and the operating pressure detected voltage transmitted from the operating pressure sensor 3k. The deviation amplifying circuit 3h amplifies the deviation transmitted from the subtracter 3g. The PWM circuit 3i generates, based on the deviation amplified by the deviation amplifying circuit 3h, a first pulse signal to control an open time of the supply solenoid valve 3d and a second pulse signal to control an open time of the exhaust solenoid valve 3e, and outputs those signals to the corresponding solenoid valves 3d and 3e. Specifically, the PWM circuit 3i outputs the first and second pulse signals with a frequency from 140 kHz to 170 kHz inclusive to control the operating pressure finely, or minutely.

When the open time of the supply solenoid valve 3d is set longer than the open time of the exhaust solenoid valve 3e, the electropneumatic regulator 3 increases the operating pressure in the operation chamber 23a (see FIG. 1) of the vacuum valve 2, thereby increasing the valve opening degree of the vacuum valve 2. When the open time of the supply solenoid valve 3d is set shorter than the open time of the exhaust solenoid valve 3e, the electropneumatic regulator 3 decreases the operating pressure in the operation chamber 23a (see FIG. 1) of the vacuum valve 2, thereby decreasing the valve opening degree of the vacuum valve 2.

<Method for Driving Supply Solenoid Valve and Exhaust Solenoid Valve>

In the vacuum pressure control system 1, the operation command section 3j is configured to perform small deviation control, supply start control, and safety control to drive the supply solenoid valve 3d and the exhaust solenoid valve 3e.

Figure 9:
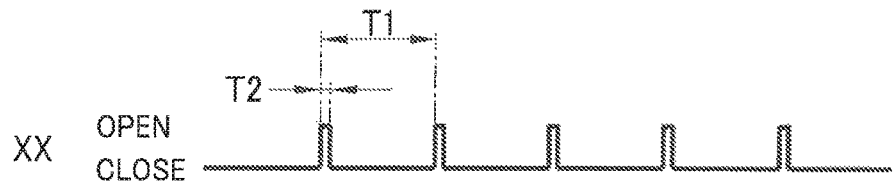
FIG. 9 is a chart schematically showing small deviation control in the vacuum pressure control system shown in FIG. 7.

FIG. 9 is a chart schematically showing the small deviation control in the vacuum pressure control system 1 shown in FIG. 7. The small deviation control is a control mode in which the supply solenoid valve 3d is opened and closed with a short open time T2 and exhaust solenoid valve 3e remains closed in order to minutely increase the valve opening degree of the vacuum valve 2.

Figure 10:
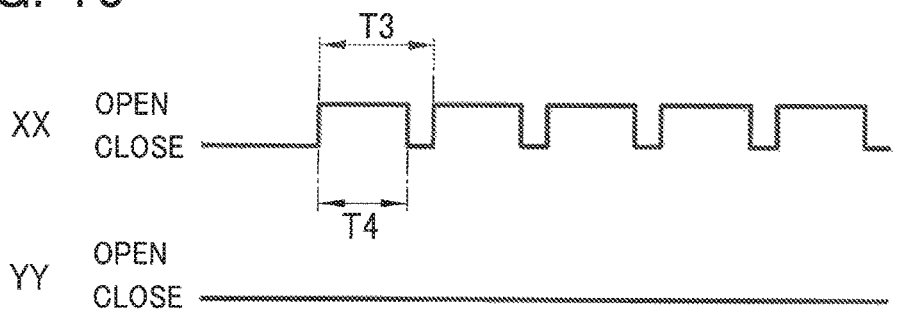
FIG. 10 is a chart schematically showing supply start control in the vacuum pressure control system shown in FIG. 7.

FIG. 10 is a chart schematically showing the supply start control in the vacuum pressure control system 1 shown in FIG. 7. This supply start control is a control mode in which the supply solenoid valve 3d is opened with a long open time T4 and the exhaust solenoid valve 3e remains closed in order to greatly increase the valve opening degree of the vacuum valve 2.

Figure 11:
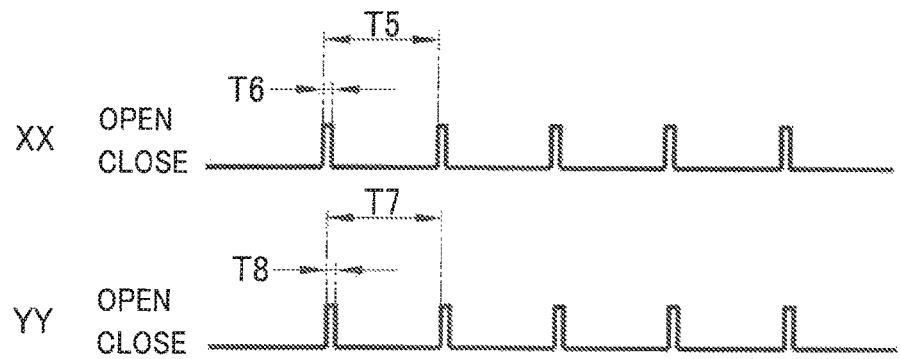
FIG. 11 is a chart schematically showing safety control in the vacuum pressure control system shown in FIG. 7.

FIG. 11 is a chart schematically showing the safety control in the vacuum pressure control system 1 shown in FIG. 7. This safety control is a control mode in which the supply solenoid valve 3d and the exhaust solenoid valve 3e of the electropneumatic regulator 3 are caused to keep on opening and closing at the same time with small pulses to maintain the valve opening degree of the vacuum valve 2 while no deviation occurs between the vacuum pressure measured value and the vacuum pressure set value.

<Operations of Vacuum Pressure Control System>

For instance, when the pressure in the vacuum vessel 8 is to be reduced from atmospheric pressure to the vacuum pressure set value (e.g., $10^{-5}$ Pa), the vacuum pressure control system 1 shown in FIG. 7 performs the small deviation control to open the vacuum valve 2 at a small valve opening degree to reduce the compression amount of the elastic seal member 18. Accordingly, gas in the vacuum vessel 8 starts to be exhausted at a low flow rate at which particles are not raised.

Figure 12:
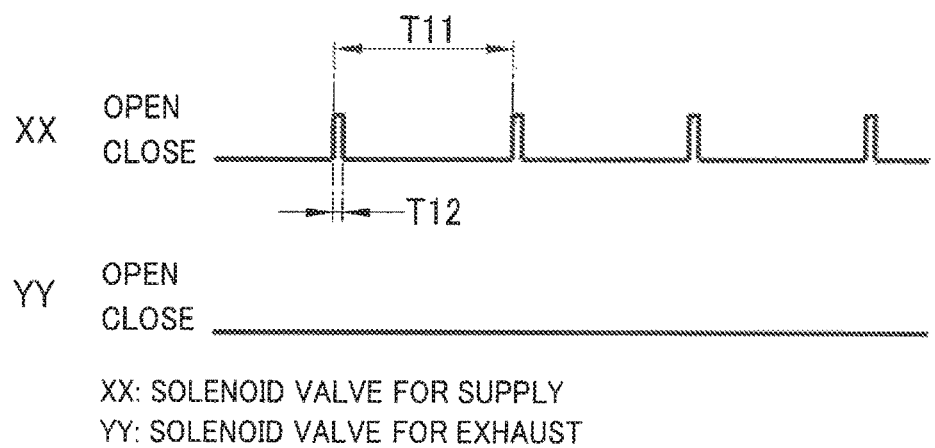
FIG. 12 is a chart schematically showing small deviation control in a conventional vacuum pressure control system.

The small deviation control will be described below by comparison between the present embodiment and the conventional example. The small deviation control in the present embodiment differs from the conventional small deviation control in frequency of the first and second pulse signals. Specifically, in the conventional small deviation control shown in FIG. 12, the supply solenoid valve 3d is opened for a short time with a frequency of 100 kHz and the exhaust solenoid valve 3e remains closed. In contrast, in the small deviation control in the present embodiment shown in FIG. 9, the supply solenoid valve 3d is opened for a short time with a frequency from 140 kHz to 170 kHz, while the exhaust solenoid valve 3e remains closed. In other words, the vacuum pressure control system 1 in the present embodiment is operated to open the supply solenoid valve 3d with a frequency about 1.5 times higher than that in the conventional example. Therefore, a cycle T1 of the first pulse signal in the present embodiment in FIG. 9 is shorter than a cycle T11 of the first pulse signal in the conventional example in FIG. 12. Thus, the small deviation control in the present embodiment can more finely, or more minutely, control the operating pressure in the vacuum valve 2 than the conventional small deviation control. The vacuum valve 2 in the present embodiment finely controls the operating pressure in a deformation region in which the piston 25 is moved while causing deformation of the slide-contact portion 272 of the packing 27. Thus, a small resolution is achieved. Consequently, the vacuum pressure control system 1 in the present embodiment can adjust the valve opening degree of the vacuum valve 2 with high response according to the command voltage output from the controller 4 to the electropneumatic regulator 3. The small deviation control in the present embodiment in FIG. 9, in which the cycle T1 is shorter than the cycle T11 in the conventional small deviation control in FIG. 12, can quickly control the operating pressure of the vacuum valve 2 to the operating pressure set value and adjust the valve opening degree to a small level even when an open time T2 is equal to an open time T12 in the conventional example in FIG. 12.

In the vacuum pressure control system 1, when the operating pressure detected by the operating pressure sensor 3k reaches a set pressure, the small deviation control mode is changed to the safety control mode, and thus the valve opening degree is maintained. Accordingly, the gas is exhausted at a low flow rate from the vacuum vessel 8, slowly decreasing the internal pressure in the vacuum vessel 8 to avoid particles from being raised or blown up.

Figure 13:
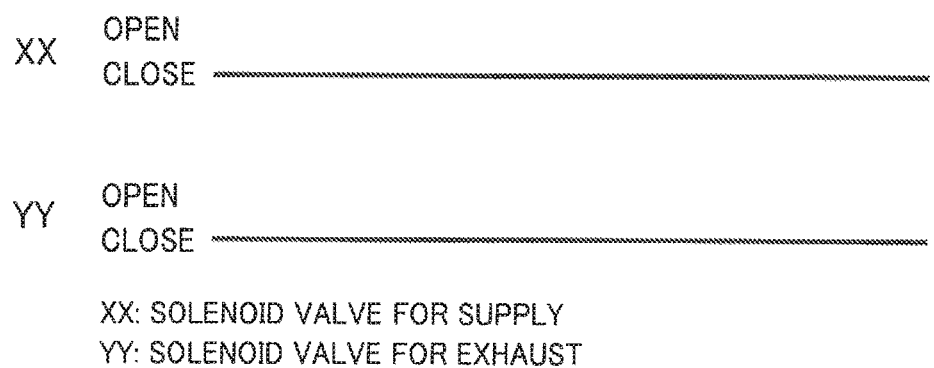
FIG. 13 is a chart schematically showing safety control in the conventional vacuum pressure control system.

The safety control will be described below by comparison between the present embodiment and the conventional example. The safety control in the present embodiment differs from the conventional safety control in method for driving the supply solenoid valve 3d and the exhaust solenoid valve 3e. Specifically, in the conventional safety control in FIG. 13, the supply solenoid valve 3d and the exhaust solenoid valve 3e remain closed. In the conventional safety control, therefore, for instance, when the vacuum pressure in the vacuum vessel 8 is slightly changed by disturbance, a state where no deviation occurs between an actual measured value of the pressure vacuum and a target value of the pressure vacuum is changed to a state where a deviation occurs, and hence the command voltage from the controller 4 is changed, it takes long to start movement of the supply solenoid valve 3d (the exhaust solenoid valve 3e). In the conventional vacuum pressure control system, it is thus difficult to adjust the valve opening degree of the vacuum valve 2 in accordance with the command voltage. In contrast, in the safety control in the present embodiment in FIG. 11, the operation command section 3j continuously outputs the first and second pulse signals to simultaneously open the supply solenoid valve 3d and the exhaust solenoid valve 3e with small pulses to the supply solenoid valve 3d and the exhaust solenoid valve 3e. Accordingly, the supply solenoid valve 3d and the exhaust solenoid valve 3e are minutely opened and closed for the same open time T6 and T8 at the same cycle T5 and T7. Thus, a supply flow rate by the supply solenoid valve 3d and an exhaust flow rate by the exhaust solenoid valve 3e are balanced out and the vacuum valve 2 maintains the operating pressure in the operation chamber 23a. Accordingly, when the vacuum pressure in the vacuum vessel 8 is slightly changed by disturbance, for example, a state with no deviation between the actual measured value and the target value (i.e. the set value) of the vacuum pressure is changed to a state with a deviation, and the command voltage of the controller 4 is changed, the open time of each of the supply solenoid valve 3d and the exhaust solenoid valve 3e is immediately adjusted according to the command voltage. Therefore, the vacuum pressure control system 1 in the present embodiment can adjust the valve opening degree of the vacuum valve 2 in accordance with the command voltage. Thus, the vacuum pressure control system 1 in the present embodiment can adjust the valve opening degree of the vacuum valve 2 with higher resolution in response than in the conventional example.

Thereafter, for example, after the pressure in the vacuum vessel 8 decreases to low vacuum (e.g., $10^{-3}$ Pa) at which particles are less likely to be raised, the vacuum pressure control system 1 performs the supply start control. In this case, in the electropneumatic regulator 3, the operation command section 3j outputs the first pulse signal to the supply solenoid valve 3d with a frequency from 140 kHz to 170 kHz. In other words, the operation command section 3j sets the cycle T3 of the first pulse signal in FIG. 10 to be equal to the cycle T1 of the first pulse signal for the small deviation control in FIG. 9 and sets the open time 14 in FIG. 10 to be longer than the open time T2 for the small deviation control in FIG. 9. At that time, the exhaust solenoid valve 3e remains closed. Accordingly, in the vacuum valve 2, the operating pressure rises and the valve opening degree is increased. This increases the exhaust flow rate of gas from the vacuum vessel 8 and hence reduces the pressure in the vacuum vessel 8 to the vacuum pressure set value (e.g., $10^{-5}$ Pa) in a short time.

It is to be noted that the conventional vacuum pressure control system is configured to set the open time of the supply solenoid valve as with the vacuum pressure control system 1 in the present embodiment to increase the valve opening degree of the vacuum valve, but use lower frequencies (e.g. 100 kHz) of the first and second pulse signals than in the present embodiment. The vacuum pressure control system 1 in the present embodiment can control the operating pressure in a shorter time to an operating pressure set value than in the conventional example to increase the valve opening degree.

Herein, since the pressure in the vacuum vessel 8 is sufficiently reduced to such a level that particles are not raised, when a high flow rate of gas is to be exhausted from the vacuum vessel 8, the vacuum pressure control system 1 is not so required to accurately control the valve opening degree of the vacuum valve 2 as compared with when a low flow rate of gas is exhausted from the vacuum vessel 8. Accordingly, in the vacuum valve 2, even when sliding resistance occurs when the valve opening degree is largely displaced, the sliding resistance does not cause a problem in pressure control of the vacuum vessel 8.

Thereafter, when the pressure in the vacuum vessel 8 reaches the vacuum pressure set value (e.g. $10^{-5}$ Pa), the controller 4 of the vacuum pressure control system 1 outputs the command voltage to bring the vacuum valve 2 in a valve closing state. Thus, the operation command section 3j of the electropneumatic regulator 3 generates the first and second pulse signals to close the supply solenoid valve 3d and open the exhaust solenoid valve 3e, and outputs those first and second pulse signals to the corresponding valves 3d and 3e. This makes the second port 3b and the third port 3c of the electropneumatic regulator 3 communicate with each other, allowing the operating fluid to be exhausted from the operation chamber 23a of the vacuum valve 2 to atmosphere. In the vacuum valve 2, the valve element 15 is pushed down together with the piston 25 in the valve seating direction by the spring force of the compression spring 33 as the pressure in the operation chamber 23a decreases. Further, the elastic seal member 18 of the valve element 15 is brought in close contact with the valve seat 14 by a sealing load of the compression spring 33. The vacuum valve 2 thus returns to the valve closing state. Subsequently, upon completion of a vapor-deposition process in the vacuum vessel 8, the vacuum pressure control system 1 exhausts the gas from the vacuum vessel 8 similarly to the above-mentioned way to control the pressure in the vacuum vessel 8.

<Resolution Test on Vacuum Pressure Control System>

The present inventors carried out a test for investigating a resolution in the example of the vacuum pressure control system 1. In the example, a single-acting valve in which PSD packing (Trade name) produced and distributed by Sakagami Seisakusho Ltd, is mounted in a recessed groove of a piston is used.

Figure 14:
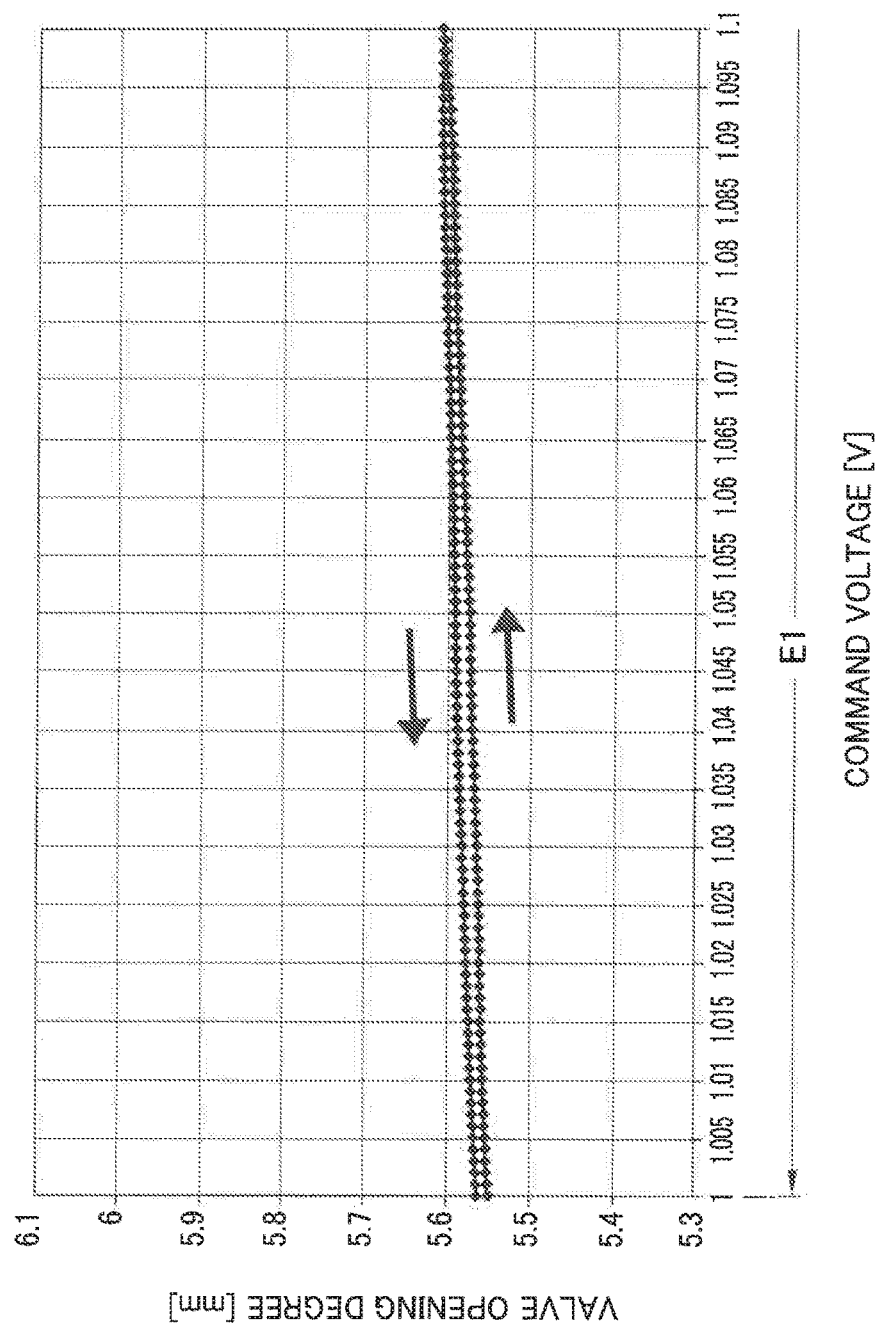
FIG. 14 is a graph showing a deformation region as a result of a resolution test on the example of the vacuum pressure control system shown in FIG. 7.
Figure 15:
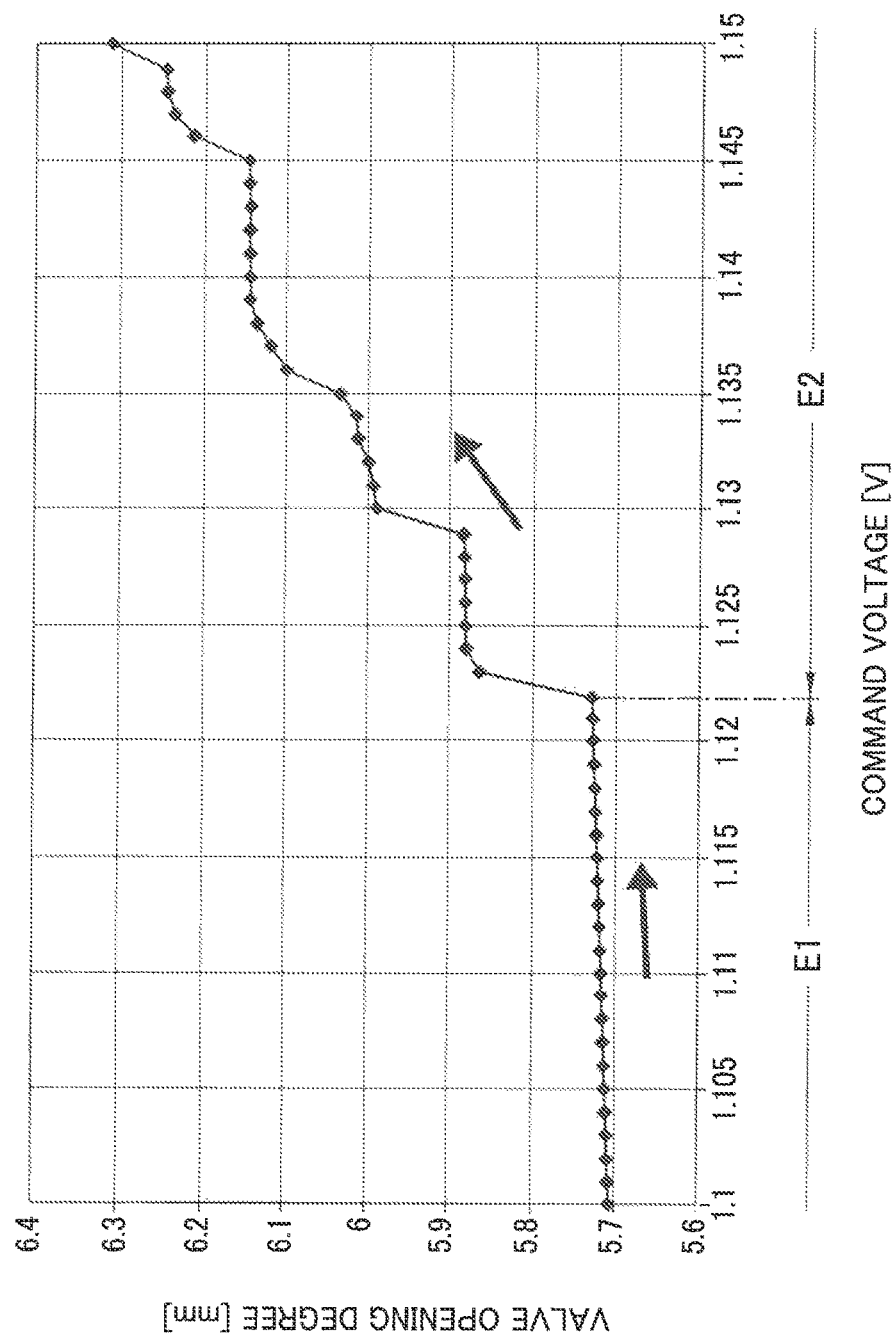
FIG. 15 is a graph showing a sliding region as a result of the resolution test on the example of the vacuum pressure control system shown in FIG. 7.

In the test, the command voltage (V) for valve opening to be output from the controller 4 is increased to raise the operating pressure, and the valve opening degree of the vacuum valve 2 is measured by a linear gauge. Further, the command voltage (V) for valve closing to be output from the controller 4 is increased to decrease the operating pressure, and the valve opening degree of the vacuum valve 2 is measured by the linear gauge. FIG. 14 is a graph showing a result of the resolution test on the example of the vacuum pressure control system 1 shown in FIG. 7, showing a deformation region E1. FIG. 15 is a graph showing a result of the resolution test on the example of the vacuum pressure control system 1 shown in FIG. 7, showing a part of the deformation region E1 and a sliding region E2. In both FIGS. 14 and 15, the vertical axis indicates the valve opening degree (mm) and the horizontal axis indicates the command voltage (V). FIG. 14 shows the results in both the valve opening direction and the valve closing direction, whereas FIG. 15 shows the results only in the valve opening direction.

As shown in FIG. 14, when the valve opening operation and the valve closing operation are performed within the deformation region (a distortion range) E1 in which the vacuum valve 2 is operated while distorting the PSD packing, the command voltage and the valve opening degree establish a linear relationship in either direction; the valve opening direction and the valve closing direction. This achieves high resolution in change of valve opening degree.

As shown in FIG. 15, in contrast, when the vacuum valve is operated in the sliding region E2 in which the PSD packing slides within the cylinder, the sliding resistance occurring between the PSD packing and the inner peripheral surface of the cylinder causes stepwise changes of the valve opening degree with respect to the command voltage (Stick-slip phenomenon). Thus, the resolution in the sliding region E2 is larger than the resolution in the deformation region E1.

In the vacuum pressure control system using the vacuum valve in which the O ring packing is mounted in the recessed groove of the piston, the sliding resistance constantly occurs during adjustment of the valve opening degree of the vacuum valve. Thus, the stick-slip phenomenon similar to that in the sliding region E2 in FIG. 15 occurs, resulting in a large resolution.

The vacuum valve using the PSD packing, providing a small resolution in the deformation region E1, can finely control a small valve opening degree close to a valve closing position by the operating pressure.

<Vacuum Pressure Control Test>

The present inventors conducted a vacuum pressure control test on a vacuum pressure control system in the example of the present embodiment and a vacuum pressure control system in the comparative example. As a test device, a regulator, a mass flow controller, an on-off valve, a tank, a vacuum valve equipped with an electropneumatic regulator, and a vacuum pump arranged in the order from an upstream side are connected in series. The controller is connected to a pressure sensor for measuring the pressure in the tank and to the electropneumatic regulator of the vacuum valve.

In the example, a vacuum valve attached with PSD packing (Trade name), produced and distributed by Sakagami Seisakusho Ltd., is used. The vacuum valve has an orifice diameter of 25 mm. In the comparative example, in contrast, a vacuum valve attached with an O ring packing having a circular cross section is used. The vacuum valve in the comparative example is constituted similar to the vacuum valve in the example excepting the O ring packing.

In the test, the pressure in the tank is controlled to rise from 25 Pa to 85 Pa by the PID control. Parameters in the PID control are adjusted by a step response method to minimize overshoot. To be specific, in the example, a proportional control parameter is set to 1.6, a differential control parameter is set to 0.07, and an integral control parameter is set to 0.02. In the comparative example, in contrast, a proportional control parameter is set to 0.4, a differential control parameter is set to 0.07, and an integral control parameter is set to 0.0.

Figure 16:
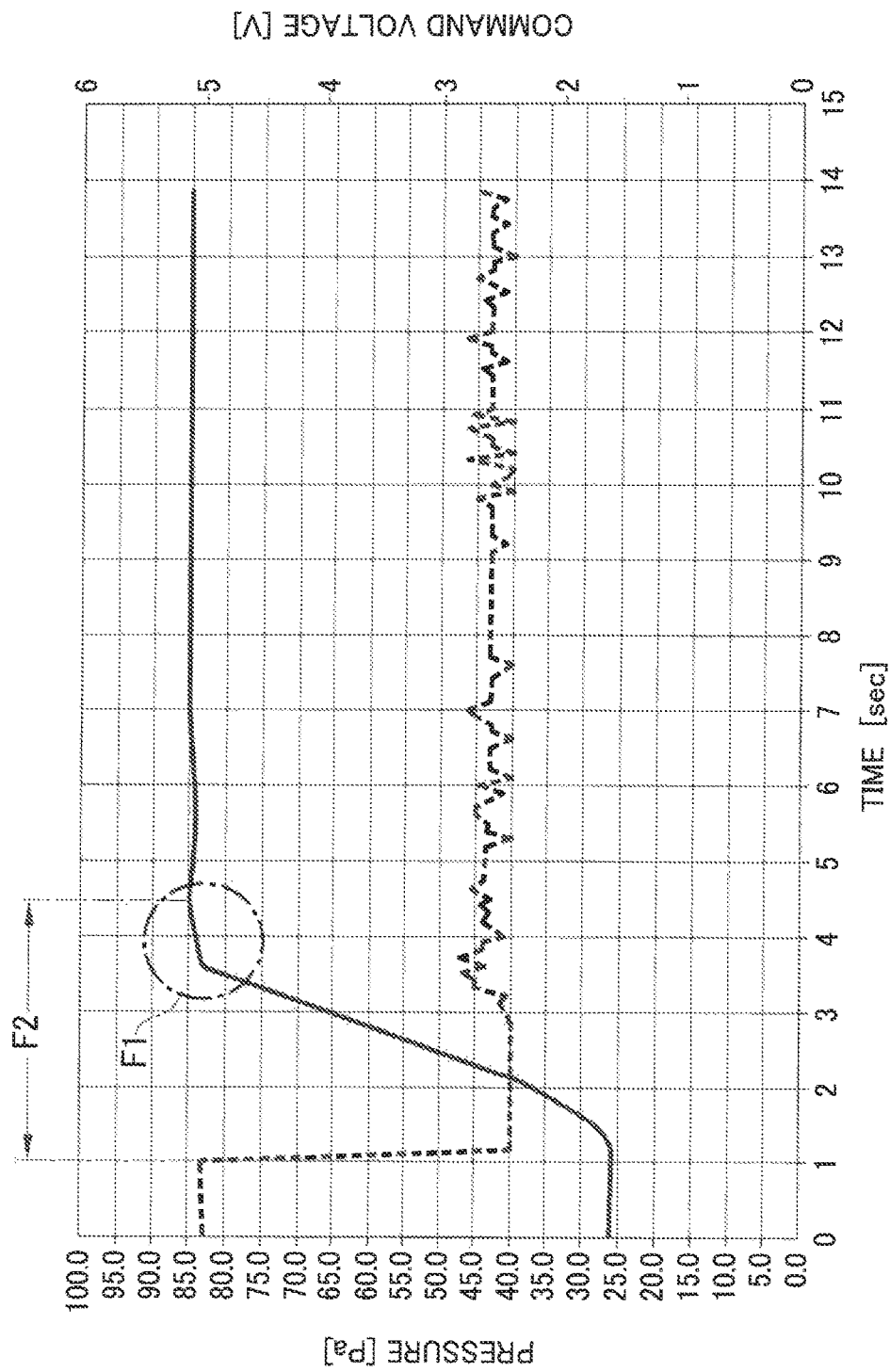
FIG. 16 is a graph showing a result of a vacuum pressure control test on the example of the vacuum pressure control system shown in FIG. 7.
Figure 17:
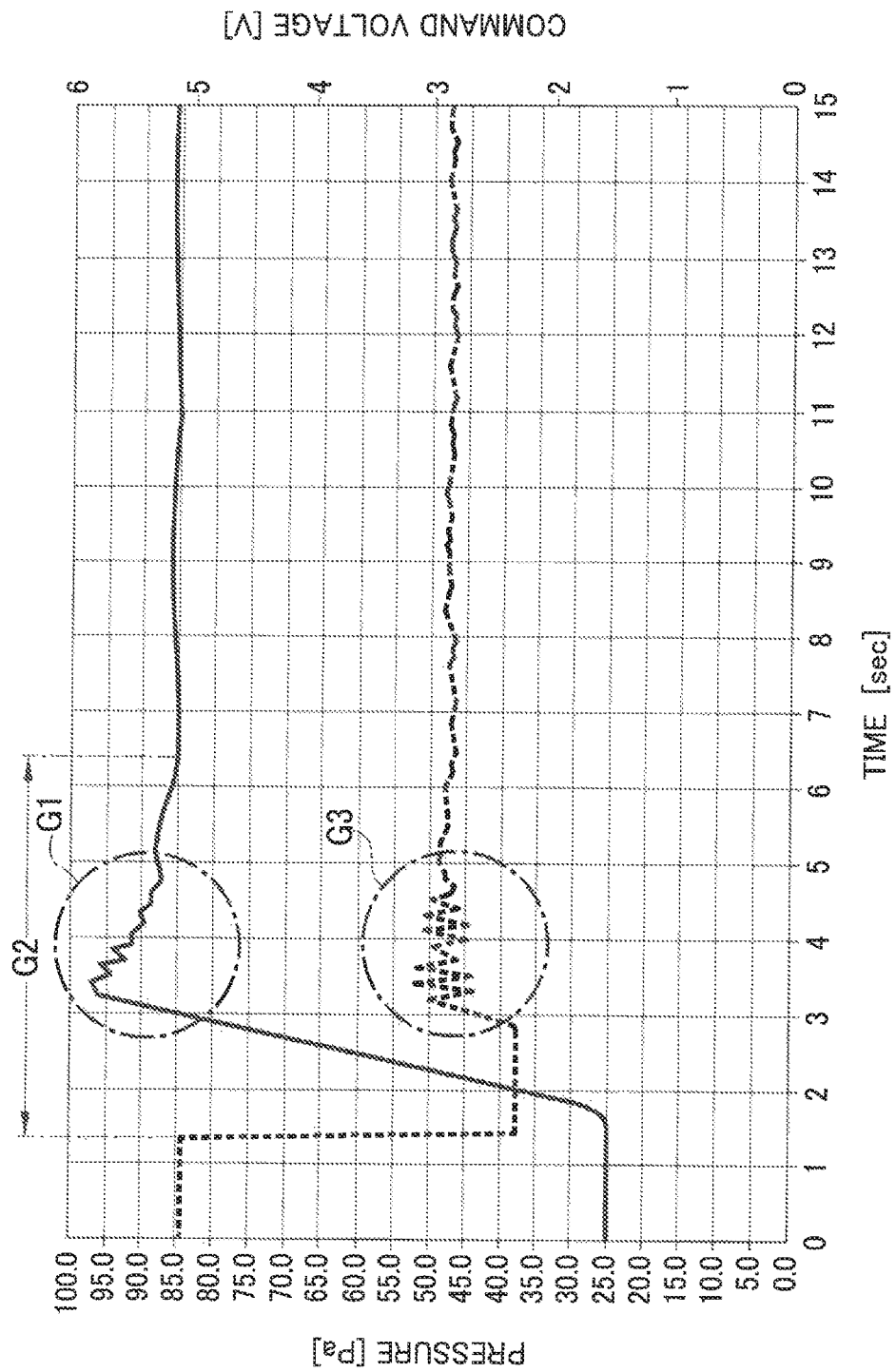
FIG. 17 is a graph showing a result of a vacuum pressure control test on the comparative example of the vacuum pressure control system shown in FIG. 7.

Results of the vacuum pressure control test are shown in FIGS. 16 and 17. Specifically, FIG. 16 is a graph showing results of the vacuum pressure control test on the example of the vacuum pressure control system shown in FIG. 7. FIG. 17 is a graph showing results of the vacuum pressure control test on the comparative example to the vacuum pressure control system shown in FIG. 7. In both FIGS. 16 and 17, the left vertical axis represents the pressure (Pa) in the tank, the right vertical axis represents the command voltage (V), and the horizontal axis represents the time (sec). In FIGS. 16 and 17, solid lines indicate the pressure wave representing changes in tank pressure and dotted lines indicate the command wave representing changes in command voltage.

As indicated by F1 in FIG. 16, in the example, the tank pressure changes from 25 Pa to 85 Pa without generating overshoot. A response time F2 required from when the controller outputs a command voltage to instruct valve opening to the electropneumatic regulator until when the tank pressure becomes stable at 85 Pa is about 3.5 seconds.

As indicated by G1 in FIG. 17, in the comparative example, in the vicinity of the tank pressure reaching 85 Pa, overshoot occurs. As indicated by G3 in FIG. 17, a command wave causes oscillation (hunting) in order to converge the overshoot. A response time G2 required from when the controller outputs a command voltage to instruct valve opening to the electropneumatic regulator until when the tank pressure becomes stable at 85 Pa is about 6 seconds.

In the example, accordingly, no overshoot occurs and thus the response time F2 can be shortened to 60% of the response time G2 in the comparative example.

The reason why the overshoot can be improved in the example is conceived because the resolution in the example differs from that in the comparative example. That is, the vacuum valve in the comparative example, configured to minutely control the valve opening degree while making the O ring packing slide on the cylinder, has a large resolution. In the comparative example, accordingly, the valve opening degree could not be accurately adjusted according to the command voltage and hence overshoot occurs near the vacuum pressure set value (85 Pa). In contrast, the vacuum valve in the example that causes no sliding resistance in the deformation region of the packing has a small resolution. In the example, accordingly, the valve opening degree can be accurately adjusted according to the command voltage and hence no overshoot occurs.

Further, the reason why the response time can be shortened in the example is conceived because the command wave in the example differs from that in the comparative example. That is, in the comparative example, even when the controller adjusts the command voltage to improve the response in order to eliminate the overshoot shown by G1 in FIG. 17, the vacuum valve could not change the valve opening degree following changes in the command voltage and hence the command wave causes oscillation (hunting) indicated by G3 in FIG. 17, resulting in a long response time. In the example, in contrast, the valve opening degree of the vacuum valve can be finely adjusted according to the command voltage and no overshoot occurs (see F1 in FIG. 16). Thus, the command wave does not cause any hunting, resulting in a short response time.

Second Embodiment

Next, a second embodiment of a vacuum valve and a vacuum pressure control system will be explained below.

Figure 18:
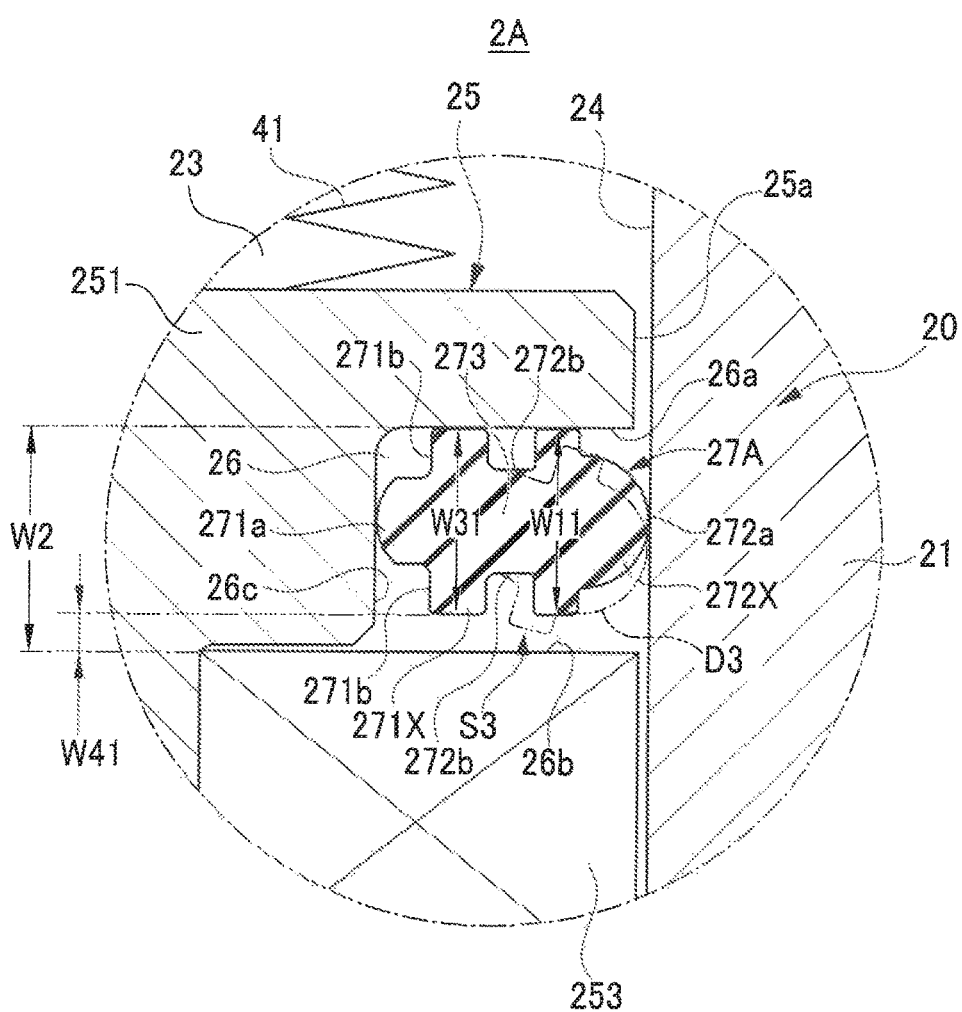
FIG. 18 is an enlarged cross sectional view of a packing and its surrounding part in a vacuum valve in a second embodiment.

FIG. 18 is an enlarged cross sectional view of part of a vacuum valve 2A, i.e. a packing 27A and its surrounding, in the second embodiment. FIG. 18 describes a clearance S3 and deformation of the packing 27A with exaggeration for purposes of easy understanding. The vacuum valve 2A mainly differs in shape of the packing 27A from the vacuum valve 2 in the first embodiment. Therefore, the following description is given with a focus on the packing 27A and uses the same reference signs to similar or identical parts to those in the first embodiment without repeating the same description.

The packing 27A is designed with the same dimension such that the first thickness W11 of a slide-contact portion 272X is equal to the thickness W31 of a contact portion 271X. The first thickness W11 and the second thickness W31 are set smaller than a groove width W2 of the recessed groove 26 in such a way that the packing 27A is movable in an axial direction (an up-down direction FIG. 18, or a seating direction and a separating direction) when the packing 27A is mounted in the recessed groove 26. In the present embodiment, the first thickness W11 and the second thickness W31 are smaller by about 0.2 mm 0.4 mm than the groove width W2. The vacuum valve 2A is used as a single-acting cylinder structure. Therefore, the packing 27A is pressed against an upper internal surface 26a of the recessed groove 26 as illustrated by a solid line in FIG. 18. Accordingly, the packing 27A is placed more offset to the opposite side (upward in FIG. 18) to the valve seat than the center of the recessed groove 26 in the axial direction, thereby generating the clearance S3 between the packing 27A and a lower internal surface 26b of the recessed groove 26. The width W41 of this clearance S3 is larger than the distance from a position of the piston 25 causing the elastic seal member 18 to seal against the valve seat 14 to a position of the piston 25 causing the elastic seal member 18 to separate from the valve seat 14. In the present embodiment, the distance from the position of the piston 25 with the elastic seal member 18 seating on the valve seat 14 to the position of the piston 25 with the elastic seal member 18 separating from the valve seat 14 is about 50 µm, whereas the width W41 of the clearance S3 is about 0.2 mm to 0.4 mm.

Further, in the vacuum valve 2A, instead of the compression spring 33 placed within the bellows 19 in the first embodiment, a compression spring 41 is placed within the cylinder 20. The compression spring 41 is provided in a compressed state on an opposite side of the piston. 25 to the valve seat to always urge the piston 25 toward the valve seat. Thus, the vacuum valve 2A can adjust the valve opening degree by sliding the piston 25 within the cylinder 20 according to balance between the spring force of the compression spring 41 and the internal pressure in the operation chamber 23a.

For example, when a low flow rate of gas is to be exhausted from the vacuum vessel 8, the above-configured vacuum valve 2A is operated to supply the operating fluid to the operation chamber 23a. As the internal pressure in the operation chamber 23a increases above the spring force of the compression spring 41, the piston 25 is also pressed in the separating direction (upward in FIG. 18). The packing 27A is pressed against the upper internal surface 26a by the operating fluid flowing in the clearance S3 from the operation chamber 23a, so that the packing 27A attempts to move together with the piston 25 (upward in FIG. 18). However, the packing 27A causes static friction force between the outermost end 272a of the slide-contact portion 272X and the inter peripheral surface 24 of the cylinder 20. The packing 27A is formed with the clearance S3 between the packing 27A and the lower inner surface 26b and thus the slide-contact portion 272X is flexibly deformable with respect to the contact portion 271X through the thin portion 273 (see a third deformed position D3 in FIG. 18). Accordingly, as soon as the piston 25 is pressed in the separating direction, the piston 25 starts to clove (starts to rise) in the separating direction (upward in FIG. 18) while flexibly deforming the slide-contact portion 272X with respect to the contact portion 271X. In the deformation region in which the piston 25 is moved (upward) while deforming the packing 27A, the vacuum valve 2A configured as above causes no sliding resistance between the slide-contact portion 272X and the cylinder 20. Therefore, the compression amount of the elastic seal member 18 can be accurately controlled by only the operating pressure as in the first embodiment. Accordingly, the vacuum valve 2A in the second embodiment can also achieve improved controllability as in the first embodiment. Further, since the vacuum valve 2A is configured such that the packing 27A is simply mounted in the recessed groove 26, it is compact and inexpensive as in the first embodiment.

When the vacuum valve 2A is operated to change a low flow rate to a high flow rate to exhaust gas from the vacuum vessel 8, the operating pressure in the operation chamber 23a rises. Thus, the piston 25 lifts up the valve element 15 in the separating direction to separate the elastic seal member 18 from the valve seat 14 while making the slide-contact portion 272X in the third deformed position D3 slide on the cylinder 20. In this way, after the piston 25 starts to move from a state with no sliding resistance, the piston 25 moves upward while generating sliding resistance. Thus, the sliding resistance less influences adjustment of the valve opening degree.

When the vacuum pressure in the vacuum vessel 8 becomes the vacuum pressure set value, the vacuum valve 2A is operated to exhaust the operating fluid from the operation chamber 23a and is brought in a valve closing state. In this case, the packing 27A is deformed in such a way that the slide-contact portion 272X is deformed as indicated by a solid line in FIG. 18 in accordance with movement (downward) of the piston 25 in the seating direction by static friction force occurring between the slide-contact portion 272X and the cylinder 20 and returns to a state where the contact portion 271X and the slide-contact portion 272X are pressed against the upper internal surface 26a. Thus, while the vacuum valve 2A is in the valve closing state, the packing 27A is always pressed against the upper internal surface 26a, enabling stable control of the valve opening degree at the start time of valve opening operation.

The foregoing embodiments are mere examples and give no limitation to the present invention. The present invention may be embodied in other specific forms without departing from the essential characteristics thereof.

For instance, the contact portion 271 may be designed with a T-shaped cross section so as to contact with the bottom surface 26c, the upper internal surface 26a, and the lower internal surface 26b of the recessed groove 26. Further, each of the contact portion 271 and the slide-contact portion 272 may be designed with a circular cross section so that the packing 27 has a snowman-like cross section consisting of two adjacent circles connected with each other). In this case, it is preferable that the maximum thickness of the slide-contact portion 272 in the axial direction is set smaller than the groove width W2 of the recessed groove 26 in the axial direction to allow easy deformation of the slide-contact portion 272 with respect to the contact portion 271.

The controller 4 may perform setting or changing of various parameters and adjusting of the valve opening degree of the vacuum valve 2 by manual operations using the personal computer 7.

The controller 4 may be configured to perform wireless communication with the electropneumatic regulator 3, the higher-level device 6, and others.

The vacuum valve 2 also may be a double-acting valve.

REFERENCE SIGNS LIST

1 Vacuum pressure control system
2, 2A Vacuum valve
3 Electropneumatic regulator
3d Solenoid valve for supply
3e Solenoid valve for exhaust
4 Controller (First input unit, Second input unit, Control setting unit)
8 Vacuum vessel
9 Vacuum pump
10 Body
14 Valve seat
15 Valve element
18 Elastic seal member
20 Cylinder
25 Piston
26 Groove
27, 27A Packing
30 Rod
271, 271X Contact portion
271a Inner circumferential portion
271b Cutout groove
272, 272X Slide-contact portion
W11 First thickness
W31 Second thickness
W2 Groove width
S3 Clearance

What is claimed is:

1. A vacuum valve comprising:
a body provided with a valve seat;
a valve element configured to contact with or separate from the valve seat;
a cylinder connected to the body and configured to be supplied with or exhaust an operating fluid;
a piston accommodated in the cylinder and provided with a recessed groove in an annular shape opening toward an inner circumferential surface of the cylinder;
a packing having an annular shape and mounted in the recessed groove; and
a rod connecting the piston and the valve element,
the vacuum valve being to be placed between a vacuum vessel and a vacuum pump and being configured to control operating pressure acting on the piston by supply and exhaust of the operating fluid with respect to the cylinder to adjust a valve opening degree corresponding to a distance between the valve element and the valve seat,
wherein the packing includes:
a contact portion provided on a radially inner side; and
a slide-contact portion provided on a radially outer side than the contact portion, and
the slide-contact portion includes a portion connecting to the contact portion, the portion having a thickness thinner than a thickness of the contact portion in an axial direction of the packing so that the slide-contact portion flexibly deforms with respect to the contact portion before the piston starts to move in an opposite direction to a previous moving direction.

2. The vacuum valve according to claim 1, further comprising:
a compression spring for urging the piston in a direction toward the valve seat; and
an operation chamber provided on a side of the piston facing to the valve seat and configured to be supplied with or exhaust the operating fluid,
wherein the packing has a shape having a first thickness at the slide-contact portion in the axial direction of the packing and a second thickness at the contact portion in the axial direction, the first thickness being equal to the second thickness, and
the second thickness is smaller than a groove width of the recessed groove in the axial direction.

3. The vacuum valve according to claim 2, wherein the contact portion is provided with an inner circumferential portion placed in contact with a bottom surface of the recessed groove and cutout grooves one on each side of the inner circumferential portion in the axial direction of the packing.

4. The vacuum valve according to claim 3, wherein
the valve element includes an elastic seal member mounted to protrude from an end face of the valve element on a side facing the valve seat,
the packing is configured such that a maximum deformation amount of the slide-contact portion in the axial direction of the packing within the recessed groove is equal to or larger than a distance between a valve closing position in which the piston causes the elastic to seal member seal against the valve seat and a separate position in which the piston causes the elastic seal member to separate from the valve seat.

5. The vacuum valve according to claim 2, wherein
the valve element includes an elastic seal member mounted to protrude from an end face of the valve element on a side facing the valve seat,
the packing is configured such that a maximum deformation amount of the slide-contact portion in the axial direction of the packing within the recessed groove is equal to or larger than a distance between a valve closing position in which the piston causes the elastic to seal member seal against the valve seat and a separate position in which the piston causes the elastic seal member to separate from the valve seat.

6. A vacuum pressure control system comprising:
the vacuum valve according to claim 2;
an electropneumatic regulator including:
a solenoid valve for supply;
a solenoid valve for exhaust;
an operation command section configured to duty-control the solenoid valve for supply and the solenoid valve for exhaust; and
an operating pressure measurement unit configured to measure the operating pressure to be output to the vacuum valve,
the electropneumatic regulator being configured to control the operating fluid to be supplied to and exhausted from the vacuum valve; and
a controller configured to receive a vacuum pressure measured value from a vacuum pressure measurement unit for measuring pressure in the vacuum vessel and output an operating pressure set value to the operation command section based on a deviation between the vacuum pressure measured value and a vacuum pressure set value, wherein the operation command section is configured to generate a first pulse signal for the solenoid valve for supply and a second pulse signal for the solenoid valve for exhaust with a frequency within a range of 140 kHz to 170 kHz based on a deviation between an operating pressure measured value measured by the operating pressure measurement unit and the operating pressure set value, and output the first pulse signal to the solenoid valve for supply and the second pulse signal to the solenoid valve for exhaust.

7. The vacuum pressure control system according to claim 6, wherein
the operation command section is configured to cause the solenoid valve for supply and the solenoid valve for exhaust to keep on opening and closing at the same time with small pulses to maintain the valve opening degree while no deviation occurs between the vacuum pressure measured value and the vacuum pressure set value.

8. The vacuum valve according to claim 1, wherein the contact portion is provided with an inner circumferential portion placed in contact with a bottom surface of the recessed groove and cutout grooves one on each side of the inner circumferential portion in the axial direction of the packing.

9. The vacuum valve according to claim 8, wherein
the valve element includes an elastic seal member mounted to protrude from an end face of the valve element on a side facing the valve seat,
the packing is configured such that a maximum deformation amount of the slide-contact portion in the axial direction of the packing within the recessed groove is equal to or larger than a distance between a valve closing position in which the piston causes the elastic to seal member seal against the valve seat and a separate position in which the piston causes the elastic seal member to separate from the valve seat.

10. A vacuum pressure control system comprising:
the vacuum valve according to claim 8;
an electropneumatic regulator including:
a solenoid valve for supply;
a solenoid valve for exhaust;
an operation command section configured to duty-control the solenoid valve for supply and the solenoid valve for exhaust; and
an operating pressure measurement unit configured to measure the operating pressure to be output to the vacuum valve,
the electropneumatic regulator being configured to control the operating fluid to be supplied to and exhausted from the vacuum valve; and
a controller configured to receive a vacuum pressure measured value from a vacuum pressure measurement unit for measuring pressure in the vacuum vessel and output an operating pressure set value to the operation command section based on a deviation between the vacuum pressure measured value and a vacuum pressure set value,
wherein the operation command section is configured to generate a first pulse signal for the solenoid valve for supply and a second pulse signal for the solenoid valve for exhaust with a frequency within a range of 140 kHz to 170 kHz based on a deviation between an operating pressure measured value measured by the operating pressure measurement unit and the operating pressure set value, and output the first pulse signal to the solenoid valve for supply and the second pulse signal to the solenoid valve for exhaust.

11. The vacuum pressure control system according to claim 10, wherein
the operation command section is configured to cause the solenoid valve for supply and the solenoid valve for exhaust to keep on opening and closing at the same time with small pulses to maintain the valve opening degree while no deviation occurs between the vacuum pressure measured value and the vacuum pressure set value.

12. The vacuum valve according to claim 1, wherein
the valve element includes an elastic seal member mounted to protrude from an end face of the valve element on a side facing the valve seat,
the packing is configured such that a maximum deformation amount of the slide-contact portion in the axial direction of the packing within the recessed groove is equal to or larger than a distance between a valve closing position in which the piston causes the elastic to seal member seal against the valve seat and a separate position in which the piston causes the elastic seal member to separate from the valve seat.

13. A vacuum pressure control system comprising:
the vacuum valve according to claim 12;
an electropneumatic regulator including:
a solenoid valve for supply;
a solenoid valve for exhaust;
an operation command section configured to duty-control the solenoid valve for supply and the solenoid valve for exhaust; and
an operating pressure measurement unit configured to measure the operating pressure to be output to the vacuum valve,
the electropneumatic regulator being configured to control the operating fluid to be supplied to and exhausted from the vacuum valve; and
a controller configured to receive a vacuum pressure measured value from a vacuum pressure measurement unit for measuring pressure in the vacuum vessel and output an operating pressure set value to the operation command section based on a deviation between the vacuum pressure measured value and a vacuum pressure set value,
wherein the operation command section is configured to generate a first pulse signal for the solenoid valve for supply and a second pulse signal for the solenoid valve for exhaust with a frequency within a range of 140 kHz to 170 kHz based on a deviation between an operating pressure measured value measured by the operating pressure measurement unit and the operating pressure set value, and output the first pulse signal to the solenoid valve for supply and the second pulse signal to the solenoid valve for exhaust.

14. The vacuum pressure control system according to claim 13, wherein
the operation command section is configured to cause the solenoid valve for supply and the solenoid valve for exhaust to keep on opening and closing at the same time with small pulses to maintain the valve opening degree while no deviation occurs between the vacuum pressure measured value and the vacuum pressure set value.

15. A vacuum pressure control system comprising:
the vacuum valve according to claim 1;

an electropneumatic regulator including:
- a solenoid valve for supply;
- a solenoid valve for exhaust;
- an operation command section configured to duty-control the solenoid valve for supply and the solenoid valve for exhaust; and
- an operating pressure measurement unit configured to measure the operating pressure to be output to the vacuum valve, the electropneumatic regulator being configured to control the operating fluid to be supplied to and exhausted from the vacuum valve; and a controller configured to receive a vacuum pressure measured value from a vacuum pressure measurement unit for measuring pressure in the vacuum vessel and output an operating pressure set value to the operation command section based on a deviation between the vacuum pressure measured value and a vacuum pressure set value, wherein the operation command section is configured to generate a first pulse signal for the solenoid valve for supply and a second pulse signal for the solenoid valve for exhaust with a frequency within a range of 140 kHz to 170 kHz based on a deviation between an operating pressure measured value measured by the operating pressure measurement unit and the operating pressure set value, and output the first pulse signal to the solenoid valve for supply and the second pulse signal to the solenoid valve for exhaust.

16. The vacuum pressure control system according to claim 15, wherein the operation command section is configured to cause the solenoid valve for supply and the solenoid valve for exhaust to keep on opening and closing at the same time with small pulses to maintain the valve opening degree while no deviation occurs between the vacuum pressure measured value and the vacuum pressure set value.

* * * * *